(12) United States Patent
Suzuki

(10) Patent No.: US 9,440,685 B2
(45) Date of Patent: Sep. 13, 2016

(54) COMPACT VEHICLE

(71) Applicant: SEARCHWARE KABUSHIKI KAISHA, Shizuoka (JP)

(72) Inventor: Masanobu Suzuki, Shizuoka (JP)

(73) Assignee: SEARCHWARE KABUSHIKI KAISHA, Shizuoka (JP)

( * ) Notice: Subject to any disclaimer, the term of this patent is extended or adjusted under 35 U.S.C. 154(b) by 13 days.

(21) Appl. No.: 14/412,116

(22) PCT Filed: Dec. 9, 2013

(86) PCT No.: PCT/JP2013/082895
§ 371 (c)(1),
(2) Date: Dec. 30, 2014

(87) PCT Pub. No.: WO2014/122846
PCT Pub. Date: Aug. 14, 2014

(65) Prior Publication Data
US 2015/0203162 A1   Jul. 23, 2015

(30) Foreign Application Priority Data
Feb. 8, 2013   (JP) ................................. 2013-022766

(51) Int. Cl.
*B62D 31/00*   (2006.01)
*B60K 1/04*   (2006.01)
(Continued)

(52) U.S. Cl.
CPC ............... *B62D 31/003* (2013.01); *B60J 5/02* (2013.01); *B60K 1/04* (2013.01); *B60L 3/0007* (2013.01);
(Continued)

(58) Field of Classification Search
CPC combination set(s) only.
See application file for complete search history.

(56) References Cited

U.S. PATENT DOCUMENTS 2,822,214 A * 2/1958 Rivolta ...................... B60J 5/02
                                                        280/775
4,412,595 A * 11/1983 Kinzel .................. B60N 2/686
                                                        180/211
(Continued)

FOREIGN PATENT DOCUMENTS

DE         816637 C      10/1951
DE        9413375 U1    12/1994
(Continued)

OTHER PUBLICATIONS

International Search Report dated Jan. 7, 2014 from corresponding International Patent Application No. PCT/JP2013/082895; 3 pgs.
(Continued)

*Primary Examiner* — Nicole Verley
(74) *Attorney, Agent, or Firm* — Maier & Maier, PLLC

(57) ABSTRACT

A seat section protecting structure, having a seat at the center thereof, is supported on a chassis frame so that it can swivel horizontally. While running, the lateral side of the seat is covered by the seat section protecting structure so as to protect the passenger from the risk of a collision from the side of the vehicle or a rollover, and while the passenger gets on/off, the seat section protecting structure swivels so that the opening, which allows the passenger to get on/off therethrough, is located on the lateral side of the vehicle. The vehicle has its seat and batteries arranged at optimal positions so as to increase the space efficiency and safety within a limited volume space. Moreover, a steering handle is provided, which is made while taking passenger accessibility into consideration, and an airbag unique to this vehicle is provided in order to increase safety.

6 Claims, 18 Drawing Sheets

(51) Int. Cl.
*B60J 5/02* (2006.01)
*B60L 3/00* (2006.01)
*B60L 11/18* (2006.01)
*B60L 15/20* (2006.01)
*B60N 2/24* (2006.01)
*B60R 21/231* (2011.01)
*B62D 21/15* (2006.01)
*B60K 7/00* (2006.01)
*B60R 21/00* (2006.01)

(52) U.S. Cl.
CPC ......... *B60L 3/0046* (2013.01); *B60L 11/1877* (2013.01); *B60L 15/20* (2013.01); *B60N 2/24* (2013.01); *B60R 21/23138* (2013.01); *B62D 21/152* (2013.01); *B60K 7/0007* (2013.01); *B60K 2001/0411* (2013.01); *B60K 2001/0416* (2013.01); *B60L 2200/22* (2013.01); *B60L 2220/46* (2013.01); *B60L 2240/12* (2013.01); *B60L 2250/10* (2013.01); *B60L 2250/26* (2013.01); *B60L 2270/145* (2013.01); *B60R 2021/0004* (2013.01); *B60R 2021/0011* (2013.01); *B60R 2021/23146* (2013.01); *B60Y 2200/112* (2013.01); *B60Y 2306/01* (2013.01); *Y02T 10/645* (2013.01); *Y02T 10/705* (2013.01); *Y02T 10/7005* (2013.01); *Y02T 10/72* (2013.01); *Y02T 10/7275* (2013.01)

(56) References Cited

U.S. PATENT DOCUMENTS

| | | | | |
|---|---|---|---|---|
| 5,082,305 | A * | 1/1992 | Le Bihan | B62D 31/003 280/496 |
| 5,921,578 | A * | 7/1999 | Sekita | B60G 3/14 280/781 |
| 5,960,901 | A * | 10/1999 | Hanagan | B60G 3/145 180/210 |
| 6,276,480 | B1 * | 8/2001 | Aregger | B62D 31/003 180/213 |
| 6,312,044 | B1 * | 11/2001 | Vigano' | B60J 5/00 296/100.06 |
| 6,719,364 | B2 * | 4/2004 | Hoppenstein | B62D 21/00 296/203.01 |
| 7,445,075 | B2 * | 11/2008 | Ozawa | B60J 5/0487 180/291 |
| 8,690,226 | B2 * | 4/2014 | Ellis | B29C 41/06 296/181.2 |
| 2003/0218319 | A1 | 11/2003 | Amamori | |
| 2006/0131847 | A1 | 6/2006 | Sato et al. | |
| 2009/0256395 | A1 * | 10/2009 | Naud | B62D 31/003 296/190.11 |

FOREIGN PATENT DOCUMENTS

| | | | |
|---|---|---|---|
| DE | 10032994 A1 * | 1/2002 | ......... B62D 31/003 |
| FR | 2240629 A5 | 3/1975 | |
| FR | 2241199 A5 * | 3/1975 | ............... B60J 5/02 |
| FR | 2700505 A1 | 7/1994 | |
| FR | 2834961 A1 | 7/2003 | |
| FR | 2950004 A1 | 3/2011 | |
| JP | 07108833 A | 4/1995 | |
| JP | 09-286348 A | 11/1997 | |
| JP | 10-219743 A | 8/1998 | |
| JP | 10-292432 A | 11/1998 | |
| JP | 2003-293392 A | 10/2003 | |
| JP | 2003-335206 A | 11/2003 | |
| JP | 4546045 B2 | 3/2004 | |
| JP | 2006-008105 A | 1/2006 | |
| JP | 2006-036002 A | 2/2006 | |
| JP | 2006-056468 A | 3/2006 | |
| JP | 2007-022459 A | 2/2007 | |
| JP | 2008-068685 A | 3/2008 | |
| JP | 2011-213312 A | 10/2011 | |
| WO | 2012/059396 A1 | 5/2012 | |

OTHER PUBLICATIONS

Japanese Office Action dated Sep. 24, 2013 from corresponding Japanese Application No. 2013-022766; 6 pgs.

Japanese Office Action dated May 1, 2013 from corresponding Japanese Application No. 2013-022766; 8 pgs.

European Search Report dated Aug. 27, 2015, including a Supplementary European Search Report and a Partial European Search Repoort, in connection with corresponding European Application No. 13874421.4 (5 pgs.).

European Office Action dated Sep. 8, 2015, in connection with corresponding European Application No. 13874421.4 (7 pgs.).

* cited by examiner

5A

5B

5C

View on arrow A-A

COMPACT VEHICLE

TECHNICAL FIELD

The present invention relates to a one- or two-seater compact vehicle suitable for city driving that has a single driver seat in the lateral direction of the vehicle, and particularly to a vehicle structure having an increased space efficiency within a limited volume space, ensuring passenger accessibility, and protecting passengers during a collision or a rollover.

BACKGROUND ART

Compact vehicles to which the present invention is directed are those that are defined in Non-Patent Document No. 1 as "ultra-compact vehicles", or "one- or two-seater vehicles that are more compact and more maneuverable than cars, have an excellent environmental performance, and offer a local, affordable means of transportation". Such a compact vehicle typically includes only one seat in the lateral direction, and is more compact and has a smaller vehicle width as compared with an ordinary car including two or more seats laterally in parallel, and it therefore imposes less burden on the road, traffic, and parking space; the body weight thereof is less than that of an ordinary car, and it can therefore reduce the environment burden by reducing $CO_2$, for example. Therefore, with such advantages, it is expecting an increasing demand in the future.

As with the one described in Patent Document No. 1, for example, such a compact vehicle includes only one driver seat in the lateral direction of the vehicle, with a frame covering the front side, the rear side, the upper side and the lower side of the seat, with an opening left open on the side of the seat for allowing a passenger to get on/off, and a door for shutting the opening is omitted in order to ensure passenger accessibility in a small parking space and realize a small weight.

A structure is employed, in which in order to allow a passenger to get on/off a passenger seat located on the rear side of the driver seat, the driver seat is movable without interfering the steering handle of the vehicle by swiveling within the vehicle chamber about an axial point provided on the frame above the vehicle.

With the structure described in Patent Document No. 2, rod-shaped side bars are provided in the opening on the side of the seat, wherein the side bars can be flipped up above the vehicle, thereby protecting the passenger and ensuring accessibility in a narrow parking space.

Patent Document No. 3 proposes various embodiments of vehicles aiming at increasing the space efficiency of the vehicle, making it easier for the driver and the passenger in the back to get on/off, and further improving the passenger protection, wherein the sixth embodiment and the seventh embodiment propose vehicles that are stretchable in the longitudinal direction.

Moreover, Patent Document No. 4 describes a compact electric vehicle in which the power battery is accommodated in the space formed in a generally quadrilateral portion of the body frame located in the body center so as to achieve battery protection, space efficiency, and mass localization.

CITATION LIST

Patent Literature

Patent Document No. 1: FR 2950004 A1
Patent Document No. 2: WO 2012059396 A1
Patent Document No. 3: Japanese Patent No. 4546045
Patent Document No. 4: Japanese Laid-Open Patent Publication No. 09-286348

Non-Patent Literature

Non-Patent Document No. 1: Ministry of Land, Infrastructure and Transport, City Bureau/Automobile Bureau, "Guidelines toward introduction of ultra-compact mobility", June 2012 [search conducted on Feb. 5, 2013], Internet <URL:http://www.mlit.go.jp/common/000212867.pdf>

SUMMARY OF INVENTION

Technical Problem

With such compact vehicles, it is one of the important development goals to improve safety as well as ensuring passenger accessibility to the vehicle in a small parking space.

Since a compact vehicle has a narrow vehicle tread, the lateral stability is lower than that of an ordinary car, and the vehicle has a higher risk of rolling over. However, by simply employing, with an ultra-compact vehicle, the conventional vehicle structure of a car, or the like, including two or more seats are in the lateral direction, it is not possible to increase the safety higher than the conventional level although it is possible to ensure the same level of safety against rollover as the conventional level. Moreover, this will not make use of the advantage of a compact vehicle that "it is light-weight, compact, and inexpensive to manufacture". That is, if the monocoque frame structure, which is widely employed by ordinary cars, and with which the rigidity strength is ensured by the body as a whole, is applied as it is, it will increase the weight of the body as a whole and decrease the vehicle's running performance, and especially it will sacrifice the fuel consumption performance, which is an advantage of an ultra-compact vehicle and increase the manufacturing cost of the vehicle.

Patent Document Nos. 1 and 2 are typical examples in which the conventional monocoque body, which is employed by ordinary vehicles, particularly passenger cars, is applied as it is to compact vehicles.

With an ordinary monocoque-structure body, since the chassis supporting the compartment for power units, such as wheels, axles, suspension devices, an engine and a transmission, and the passenger compartment are integrally formed with respect to the vehicle body, a structure design with a high torsional rigidity and a high flexural rigidity is required as a whole so as to avoid even a slight distortion on doors and window openings formed in the passenger compartment. Therefore, when the vehicle receives an impact from a collision such that the body deforms, the body as a whole will deform, including an opening such as a door frame. Thus, for repairing the vehicle, it is necessary to sufficiently modify the body upper structure such as a door frame, as well as the modification/repair on the body lower structure, which is necessary for the vehicle to run stably. Moreover, the modification on the upper structure may influence the lower structure, thereby losing the vehicle's alignment. Thus, repairing a vehicle requires a high level of technique and skills.

Although it is said to be a monocoque (literally, "single shell"), a monocoque body needs many openings for doors and windows in order to ensure accessibility to the passenger compartment. These openings require a reinforcement with a pillar or a subframe for each opening in order to ensure the rigidity and strength for the vehicle as a whole, thereby leading to an increase in the body weight. Typically, as the openings have larger areas and as the interior space volume is larger, there needs to be a stronger reinforcement.

Patent Document No. 1 discloses that doors on the side of the seat of the vehicle are eliminated in order to suppress the increase in the body weight, where there are large openings on the side of the seat, thereby ensuring passenger accessibility, but it fails to present any solution to a collision from the side of the vehicle or a rollover of the vehicle.

Patent Document No. 2 provides side bars, which are lighter in weight than doors, in the opening, thereby roughly protecting the passenger, but it is not possible only with side bars to completely prevent the passenger from being exposed to wind and rain, and if it rolls over when the passenger is not wearing a seatbelt, neglecting safety obligations, it is not possible to prevent parts of the passenger's body, such as a hand or a leg, from extending out of the vehicle as a reflex.

The first to fifth embodiments of Patent Document No. 3 are directed to a structure in which the side of the vehicle is left open, similar to Patent Document Nos. 1 and 2, and they fail to present any solution to the protection of the passenger in the case of a collision from the side or a rollover.

The roofed, stretchable vehicle of the sixth embodiment and the seventh embodiment employ a structure in which the body stretches/shrinks so that it has a compact space when parked. The passenger gets on/off by stepping over a frame or from the front side of the vehicle with the roof being widely open, thus leaving room for improvement for passenger accessibility. As with the preceding embodiments, they fail to present any solution to the protection of the passenger in the case of a collision from the side or a rollover.

With ultra-compact electric cars using a motor as the vehicle's driving source, a high-voltage battery power source of 60 V or more tends to be used in order to increase the motor speed, and it is therefore also an important technical problem to ensure the safety of a high-voltage power source, taking into consideration a collision or a rollover, as well as the safety of the passenger.

In the battery mounting structure disclosed in Patent Document No. 4, batteries are arranged so as to be surrounded by the body while being localized on the inner side of the body under the floor of the vehicle, and the batteries are protected by the strength of the body. However, the body weight will increase in order to ensure the strength, and since the batteries are arranged under the floor, the floor of the passenger compartment will be higher, thereby detracting from the drivability and accessibility.

Moreover, Patent Document No. 4 discloses a structure in which the batteries are arranged at the center of the body in the left-right direction so as to localize the mass at the center. However, with a compact vehicle having a narrow tread, if the mass is localized at the center of the vehicle, it will decrease the inertial force against a force from the side of the vehicle and lower the rollover resistance, as compared with those in which the mass is distributed.

With a compact vehicle having a narrow tread, the arrangement of the batteries (mass management) in the left-right direction of the vehicle, as well as the protection of the batteries in the case of a rollover, is one of the problems that need to be considered while taking into account the balance between the maneuverability and the rollover resistance.

Thus, it is an object of the present invention to provide a vehicle having a single passenger seat in the lateral direction that has such a vehicle structure that increases the space efficiency within a limited volume space of a compact vehicle, ensures passenger accessibility, and protects the passenger in a collision and a rollover.

Solution to Problem

A compact vehicle according to the present invention for solving problems set forth above is a compact vehicle including:

a chassis frame supporting a front wheel, a rear wheel, a driving device for driving the front wheel or the rear wheel, and a steering device for steering the front wheel or the rear wheel;

a passenger compartment arranged generally at a center of the chassis frame; and a single passenger seat in a width direction of the vehicle, the passenger seat being arranged in the passenger compartment, wherein:

a passenger protecting structure is formed by an outer shell of the passenger compartment and a sub-frame;

the passenger protecting structure is formed by a seat section protecting structure and a front section protecting structure;

the seat section protecting structure: covers lateral sides and an upper side of the seat; has a single opening on a front side of the seat, allowing the passenger to get on/off; and is supported on the chassis frame so that the seat section protecting structure can swivel horizontally together with the seat; and the front section protecting structure: is capable of coupling to the seat section protecting structure so as to shut the opening of the seat section protecting structure; and is supported on the chassis frame independently of the seat section protecting structure.

Note that the concept of directions as used in the present invention is based on the direction as viewed from the driver on a running vehicle. Accordingly, the "front side of the seat" as in "a single opening on a front side of the seat, allowing the passenger to get on/off" recited herein refers to the front side with respect to the vehicle running direction in a state where the seat section protecting structure has not swiveled (the un-swiveled position), but not to the front side of the vehicle when it has swiveled.

The invention further describes, wherein:

an un-swiveled position is defined as a position where the opening of the seat section protecting structure is facing in a forward direction with respect to a vehicle running direction;

a swiveled position is defined as a position where the opening of the seat section protecting structure is facing either left or right with respect to the vehicle running direction;

a coupled position is defined as a position where the front section protecting structure and the seat section protecting structure are coupled to each other;

a separated position is defined as a position where the front section protecting structure and the seat section protecting structure are separated from each other; and the front section protecting structure or the seat section protecting structure is moved between the coupled position and the separated position so that the front section protecting structure is out of a range of swivel of the seat section protecting structure so that the seat section protecting structure can swivel between the un-swiveled position and the swiveled position.

The invention further describes, wherein:

a structure moving space area is provided on a lateral side of the front wheel or the rear wheel above the chassis frame, the structure moving space area allowing the front section protecting structure or the seat section protecting structure to move between the coupled position and the separated position; and the structure moving space area shares a space with a crushable zone in which the chassis frame can deform upon a head-on collision or a rear-end collision of the vehicle so as to absorb an impact energy upon collision.

The invention further describes, wherein:

a structure moving space area is provided on a lateral side of the front wheel or the rear wheel above the chassis frame, the structure moving space area allowing the front section protecting structure or the seat section protecting structure to move between the coupled position and the separated position;

a battery protection case for accommodating a battery for supplying power to the driving device is supported on the chassis frame via a battery support member between a rear side of the front wheel and the passenger protecting structure or between a front side of the rear wheel and the passenger protecting structure;

an impact strength of the battery support member is set to be lower than an impact strength of the battery protection case; and when the vehicle undergoes a collision on a side surface thereof, the battery support member can deform and break, thereby allowing the battery protection case to move into the structure moving space area.

The invention further describes, wherein:

the front section protecting structure is supported, via a support member, on the chassis frame independently of the seat section protecting structure;

a bent portion is formed in an intermediate portion of the support member of the front section protecting structure; and an impact strength of the support member of the front section protecting structure is set to be lower than an impact strength of the passenger protecting structure.

The invention further describes, wherein:

the seat section protecting structure includes, in a vertically intermediate portion thereof, a generally arc-shaped rear horizontal sub-frame extending from behind the seat and covering a left side and a right side to be open on a front side;

the front section protecting structure includes, in a vertically intermediate portion thereof, a generally arc-shaped front horizontal sub-frame which is open on a rear side; and a ring-shaped horizontal sub-frame assembly is formed by the rear horizontal sub-frame and the front horizontal sub-frame.

The invention further describes, wherein:

the opening of the seat section protecting structure is reinforced by a ring-shaped vertical sub-frame.

The invention further describes, the invention including:

coupling lock means capable of coupling and de-coupling between the front section protecting structure and the opening of the seat section protecting structure; and positioning means for regulating a position of a coupled portion between the front section protecting structure and the opening of the seat section protecting structure.

The invention further includes:

a chassis frame supporting a front wheel, a rear wheel, a driving device for driving the front wheel or the rear wheel, and a steering device for steering the front wheel or the rear wheel;

a passenger compartment arranged generally at a center of the chassis frame; and a single passenger seat in a width direction of the vehicle, the passenger seat being arranged in the passenger compartment, wherein:

a passenger protecting structure is formed by an outer shell of the passenger compartment and a sub-frame;

the passenger protecting structure includes a seat section protecting structure;

the seat section protecting structure: covers lateral sides and an upper side of the seat; has a single opening on a front side of the seat, allowing the passenger to get on/off; and is supported on the chassis frame so that the seat section protecting structure can swivel horizontally together with the seat; and the seat section protecting structure includes a steering handle, wherein the steering handle: is supported at a bottom end portion thereof so that the steering handle can pivot about a generally vertical axis of a steering post attached at a center of the seat section protecting structure in a left-right direction under the seat; diverges from the steering post sideways left and right, extending upward between an outer side of the seat and left and right inner walls of the seat section protecting structure along the inner walls; and includes a handle grip provided on an upper end portion thereof.

The invention further includes:

a chassis frame supporting a front wheel, a rear wheel, a driving device for driving the front wheel or the rear wheel, and a steering device for steering the front wheel or the rear wheel;

a passenger compartment arranged generally at a center of the chassis frame; and a single passenger seat in a width direction of the vehicle, the passenger seat being arranged in the passenger compartment, wherein:

a passenger protecting structure is formed by an outer shell of the passenger compartment and a sub-frame;

the passenger protecting structure includes a seat section protecting structure;

the seat section protecting structure: covers lateral sides and an upper side of the seat; has a single opening on a front side of the seat, allowing the passenger to get on/off; and is supported on the chassis frame so that the seat section protecting structure can swivel horizontally together with the seat;

the seat section protecting structure includes a rear seat on a rear side of the seat;

the rear seat is arranged to be offset to one of a left side and a right side with respect to a center of the vehicle as viewed from above; and a front direction of the rear seat is oriented in a diagonal forward direction inclined to the other side.

The invention further describes, wherein:

the seat located on a front side of the rear seat is supported so that the seat can move in a direction of the opening of the seat section protecting structure.

The invention further includes:

a chassis frame supporting a front wheel, a rear wheel, a driving device for driving the front wheel or the rear wheel, and a steering device for steering the front wheel or the rear wheel;

a passenger compartment arranged generally at a center of the chassis frame; and a single passenger seat in a width direction of the vehicle, the passenger seat being arranged in the passenger compartment, wherein:

a passenger protecting structure is formed by an outer shell of the passenger compartment and a sub-frame;

the passenger protecting structure includes a seat section protecting structure;

the seat section protecting structure: covers lateral sides and an upper side of the seat; has a single opening on a front side of the seat, allowing the passenger to get on/off; and is supported on the chassis frame so that the seat section protecting structure can swivel horizontally together with the seat;

a slope inclined upwardly away from a center of the vehicle is formed on a lower outer side of the passenger protecting structure;

battery protection cases for accommodating batteries for supplying power to the driving device are supported on the chassis frame via battery support members in left-right symmetry with respect to a longitudinal center line of the vehicle, the battery protection cases being located between an inner rear side of the front wheel and the passenger protecting structure or between an inner front side of the rear wheel and the passenger protecting structure, wherein the battery support members have an impact strength set to be lower than an impact strength of the battery protection cases;

a slope corresponding to a slope in a lower outer portion of the passenger protecting structure is formed on a surface of the battery protection case facing toward a center of the vehicle; and when the vehicle undergoes a collision, the battery support member can deform and break, thereby allowing the battery protection case to move along the lower outer slope of the passenger protecting structure.

The invention further includes:

a chassis frame supporting a front wheel, a rear wheel, a driving device for driving the front wheel or the rear wheel, and a steering device for steering the front wheel or the rear wheel;

a passenger compartment arranged generally at a center of the chassis frame; and a single passenger seat in a width direction of the vehicle, the passenger seat being arranged in the passenger compartment, wherein:

a passenger protecting structure is formed by an outer shell of the passenger compartment and a sub-frame;

the passenger protecting structure includes a seat section protecting structure;

the seat section protecting structure: covers lateral sides and an upper side of the seat; has a single opening on a front side of the seat, allowing the passenger to get on/off; and is supported on the chassis frame so that the seat section protecting structure can swivel horizontally together with the seat; and battery protection cases for accommodating batteries for supplying power to the driving device are supported on the chassis frame in a distributed manner in left-right symmetry, between an inner rear side of the front wheel and the passenger protecting structure or between an inner front side of the rear wheel and the passenger protecting structure, and wherein:

the passenger protecting structure and at least a portion of the battery protection cases overlap with each other as viewed from above; or an outer profile of the front wheel or the rear wheel and at least a portion of the battery protection cases overlap with each other as viewed from side; or the passenger protecting structure and at least a portion of the battery protection cases overlap with each other as viewed from side.

The invention further includes:

a chassis frame supporting a front wheel, a rear wheel, a driving device for driving the front wheel or the rear wheel, and a steering device for steering the front wheel or the rear wheel;

a passenger compartment arranged generally at a center of the chassis frame; and a single passenger seat in a width direction of the vehicle, the passenger seat being arranged in the passenger compartment, wherein:

a passenger protecting structure is formed by an outer shell of the passenger compartment and a sub-frame;

the passenger protecting structure includes a seat section protecting structure;

the seat section protecting structure: covers lateral sides and an upper side of the seat; has a single opening on a front side of the seat, allowing the passenger to get on/off; and is supported on the chassis frame so that the seat section protecting structure can swivel horizontally together with the seat;

the seat section protecting structure includes a head protecting airbag to be deployed during a collision or a rollover;

the head protecting airbag is fixed to an inner side of the seat section protecting structure above an upper side and a lateral side of a head of the passenger seated in the single driver seat in the width direction of the vehicle;

when undeployed, the head protecting airbag is folded and accommodated in an airbag container along an inner wall of the seat section protecting structure while being close to the inner side of the seat section protecting structure; and when deployed, the head protecting airbag is deployed into a semi-flattened dome-shaped so as to cover a front side and a lateral side of the head of the passenger while an upper end portion and left and right lateral end portions of the airbag remain fixed to the inner side of the seat section protecting structure.

The invention further includes:

a chassis frame supporting a front wheel, a rear wheel, a driving device for driving the front wheel or the rear wheel, and a steering device for steering the front wheel or the rear wheel;

a passenger compartment arranged generally at a center of the chassis frame; and a single passenger seat in a width direction of the vehicle, the passenger seat being arranged in the passenger compartment, wherein:

a passenger protecting structure is formed by an outer shell of the passenger compartment and a sub-frame;

the passenger protecting structure includes a seat section protecting structure;

the seat section protecting structure: covers lateral sides and an upper side of the seat; has a single opening on a front side of the seat, allowing the passenger to get on/off; and is supported on the chassis frame so that the seat section protecting structure can swivel horizontally together with the seat;

the seat section protecting structure includes a side airbag to be deployed during a collision or a rollover;

the side airbag is located on a side of the seat, and when undeployed, the side airbag is folded and accommodated between an inner side of an outer shell of the seat section protecting structure formed in an arc shape bulging outwardly, and an interior cover while being close to the inner side of the outer shell; and when deployed, the side airbag expands from the inner side of the outer shell of the seat section protecting structure toward a center of the passenger compartment while being close to the inner side of the outer shell.

Advantageous Effects of Invention

According to the present invention, the following effects are achieved.

With the configuration of the present invention, it is possible to ensure passenger accessibility, and the seat section protecting structure can reliably protect the passenger during a lateral collision or a rollover.

The seat section protecting structure has an opening on the front side of the seat for allowing the passenger to get on/off, and since the opening swivels, together with the seat, to the position on the side for getting on/off, it is easy to get on/off even in a narrow parking space without having to ensure a space on the side for allowing the door to open.

While the vehicle is running, the seat section protecting structure has no opening on the side of the seat through which the passenger can get on/off, thus achieving a strength necessary for safely protecting the passenger with a lightweight, simple frame configuration. Particularly, it is possible to protect the passenger during a collision from the side or a rollover for which it is difficult to ensure the impact absorbing space area (crushable zone) of the vehicle.

With a common monocoque body, the compartment for driving devices such as the engine and the passenger compartment exist adjacent to each other, sharing a structurally integral wall called a "bulk head". With the present invention, the passenger compartment is independent of other compartments, and is not sharing a wall. Therefore, the deformation or vibrations of the power compartment will not directly influence the passenger compartment.

Since the chassis frame and the passenger compartment are independent of each other, even if the chassis deforms by absorbing the energy of collision due to an impact upon collision, the passenger compartment will not deform, and the passenger inside the passenger compartment will not get hurt. If the impact upon collision is so large that it exceeds the level of energy that can be absorbed by the body, and the passenger compartment may receive a direct impact, the passenger compartment may be detached from the chassis frame to protect the passenger therein.

Moreover, the repair of the body having undergone an impact can be done as necessary separately for the chassis and the passenger compartment. A low level of impact may only require modification of the chassis frame and the repair of the support portion between the body and the passenger protecting structure, and does not require the repair of the passenger protecting structure of the passenger compartment.

Since the chassis frame and the passenger protecting structure are structurally independent of each other, it is possible to separately manufacture the chassis and the passenger protecting structure, and it is possible to easily provide vehicles of different forms satisfying the demands of the consumers by combining variations of the passenger protecting structure with variations of the chassis frame.

Now, variations of different chassis frames refer to combinations of power units, drive system, suspension system, etc., and variations of passenger protecting structures refer to those of cabin volume, etc., depending on the number of passengers.

The opening on the front side of the seat section protecting structure is shut by the front section protecting structure except when the passenger is getting on/off. Thus, it is possible to prevent the passenger from jumping out forward during a collision, to reserve the passenger compartment as the survival space, and further to protect the passenger from wind and rain.

With the configuration of the present invention, when the seat section protecting structure is swiveled, it can be swiveled smoothly without interference with the front section protecting structure, and a large opening for allowing the passenger to get on/off is positioned on the side of the vehicle in the swiveled position, thereby allowing the passenger to easily get on/off even if there is no space on the side when parked.

In the coupled position, the side of the seat is shut by the seat section protecting structure, and it is possible to protect the passenger during a collision from the side or a rollover.

With the configuration of the present invention, since the structure moving space area shares a space with the crushable zone capable of absorbing an impact energy upon collision, it is possible to efficiently utilize the space.

Moreover, a luggage box, capable of moving following a moving structure, can be provided in the structure moving space area, in which case the structure moving space area, which shares a space with the crushable zone, can also be used as a luggage storing space.

With the configuration of the present invention, since the structure moving space area shares a space with the space through which the battery protection case moves during a collision from the side, it is possible to efficiently utilize the space, and it is possible to prevent the damage of the battery without increasing the weight of the body as compared with a conventional structure where the battery is protected by the strength of the body.

During a collision from the side, the inertial energy from the movement of the battery, which is a heavy object, and the deformation energy of the support bracket, it is possible to effectively absorb the energy upon collision. Moreover, since the strength of the battery support member is set to be lower than the strength of the battery protection case, the battery protection case absorbs the impact energy while moving into the structure moving space area where there are no other robust structures during a collision. Therefore, the battery protection case is prevented from being pinched and squashed by other structures, thereby preventing the battery from being damaged.

With the configuration of the present invention, even if the chassis frame deforms to absorb an energy upon collision during a collision of the vehicle, the bent portion formed in the support member of the front section protecting structure buckles, thereby mitigating the transmission of the impact from the front section protecting structure to the passenger protecting structure, thus protecting the passenger compartment.

The front section protecting structure is movably supported on the chassis frame via the support member, and the bent portion prevents the interference between the support member and the front section protecting structure when the front section protecting structure moves forward.

With the configuration of the present invention, the passenger protecting structure is reinforced by the ring-shaped horizontal sub-frame assembly, and it is possible to reliably protect the passenger during a collision and a rollover. Particularly, during a rollover, the horizontal sub-frame contacts the ground to protect the portion to be in contact with the ground by means of the horizontal sub-frame assembly, and it is possible to prevent the passenger protecting structure from breaking during a rollover by dispersing the stress from the ground.

Since the front and rear sub-frames are continuous with each other, it is possible to effectively disperse the stress in the front-rear direction between the seat section protecting structure and the front section protecting structure. Even if a transparent window screen for ensuring the visibility of the passenger is provided on top of the horizontal frame assembly, it is possible to reliably support the screen.

With the configuration of the present invention, it is possible to ensure the strength of the opening by the ring-shaped vertical sub-frame. By using a material such as a metal for the sub-frame, the dimension of the coupled portion becomes stable, thereby facilitating the dimension control during the manufacture of the body.

With the configuration of the present invention, the coupling lock means makes reliable the coupling between the seat section protecting structure and the front section protecting structure, and the positioning means prevents the coupled portion from shifting. While coupled, the stress is distributed between the seat section protecting structure and the front section protecting structure, and it is possible to ensure the strength for protecting the passenger by the passenger protecting structure as a whole.

With the configuration of the present invention, the steering handle is absent in the center of the opening in front of the seat, thereby making it easier for the passenger to get on/off, and the handle will not be an obstacle for the swivel when the frame swivels, thereby making it possible to reduce the amount of longitudinal movement of the frame. Also when the seat is moved to allow the passenger to get on/off, the steering handle will not hinder the front-rear movement of the seat, and it is therefore possible to enable a large amount of movement of the seat When getting on/off, the handle grip portion can be used also as an auxiliary grip for getting on/off.

Since the rotation axis of the steering handle is supported below the seat, the passenger can operate it in an easy position with bent arms, thus facilitating the handle operation.

With the configuration of the present invention, since the passenger rear seat is provided diagonally, the length of the passenger compartment in the longitudinal direction can be made short, and it is possible to create a rear seat space within a small space with little sense of oppression, by ensuring a space beside the passenger's shoulders and ensuring a space with no protruding objects in front of the passenger's eyes.

There is an extra room also around the passenger's knees so that the passenger can be seated in a comfortable posture.

The child seat can be provided detachable in front of the passenger seat, and the passenger can keep an eye on a child seated in the child seat. Moreover, since the height of the eye line of the passenger can be substantially the same as the height of the eye line of the seated child, it is possible to give a sense of safety both to the passenger and to the child.

With the configuration of the present invention, the seat moves toward the direction of the opening of the seat section protecting structure in the swiveled position. Therefore, the seat can be moved by a greater distance since there is no obstacles in front, such as the steering or the dashboard, thus improving accessibility for the driver and accessibility for the passenger to the rear seat.

With the configuration of the present invention, when the vehicle undergoes a lateral collision, the battery protection case moves as if to slide along the tangential line of outer surface of the passenger protecting structure. Therefore, it contacts the passenger protecting structure in a surface contact without localizing the stress of impact, and it is possible to effectively prevent the passenger protecting structure from being damaged. In the case of a head-on collision or a rear-end collision, the battery protection case moves as if to be pushed out of the vehicle left or right along the outer surface of the passenger protecting structure, and it is possible to protect the battery and the passenger protecting structure from a damage.

With the configuration of the present invention, the area on the inner side of the wheels and the space around the passenger protecting structure can be utilized effectively. Moreover, since the battery protection case is arranged while being inclined with respect to the longitudinal axis or the left-right axis of the vehicle, when taking out the battery for maintenance, the battery can be removed from the side of the vehicle without having to remove the passenger protecting structure and the wheels. Since the batteries are distributed left and right, the inertial force of the vehicle in the roll direction is increased, and it is possible to increase the resistance against rollover even with a vehicle with a narrow tread.

With the configuration of the present invention, the airbag is deployed on the front side of the head of the passenger, and using it together with the seatbelt, it is possible to reduce the amount of movement of the head of the passenger, as compared with a case where an airbag is provided in the steering handle, thus minimizing the damage to the head or the neck of the passenger.

Note that it is even more effective if the seatbelt is one with a pretensioner device, which automatically retracts the belt upon detection of a collision, thereby starting to restrain the passenger earlier.

With the configuration of the present invention, since the airbag is configured so as to expand into a space beside the seat and between the seat and the inner side of the outer shell of the passenger protecting structure, toward the center of the passenger compartment while being close to the inner side of the outer shell of the passenger protecting structure. Therefore, it is possible to ensure a large space for deploying the airbag, thereby allowing for reliable deployment of the side airbag, and also making it possible to accommodate a larger airbag than conventional airbags. Since it is expanded while being close to the inner side of the outer shell of the passenger protecting structure, the reaction force during the expansion can be reliably received on the inner side of the outer shell of the seat section protecting structure 22, thereby reliably preventing the passenger from moving toward side surfaces.

DESCRIPTION OF EMBODIMENTS

Embodiments of the present invention will now be described with reference to the drawings. Note that the concept of directions as used in the following direction is based on the direction as viewed from the driver on a running vehicle.

Figure 1:
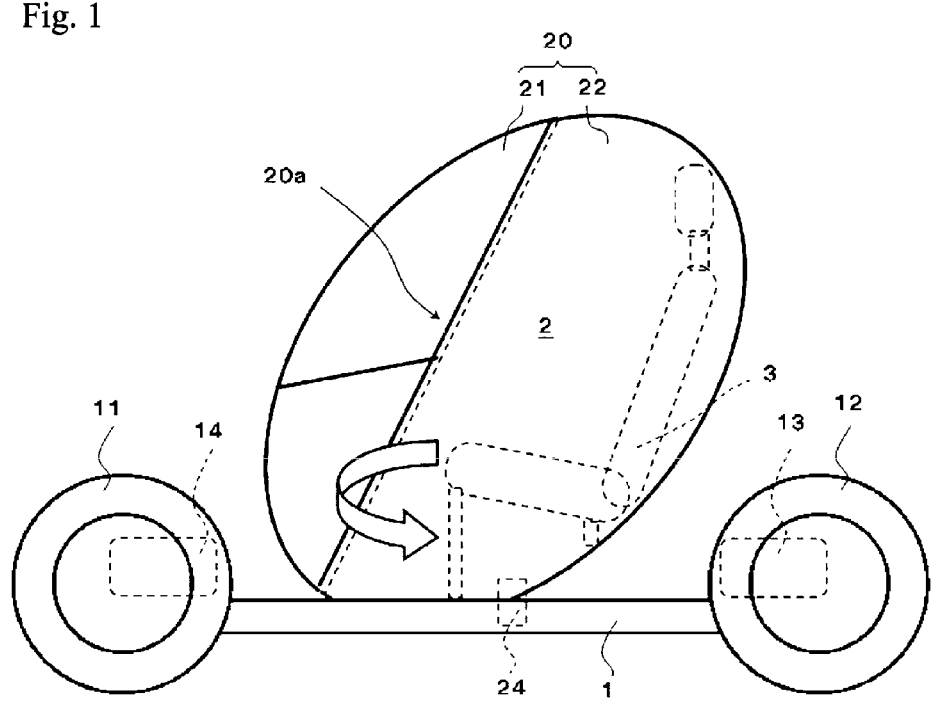
FIG. 1 A side view of an entire compact vehicle.
Figure 2:
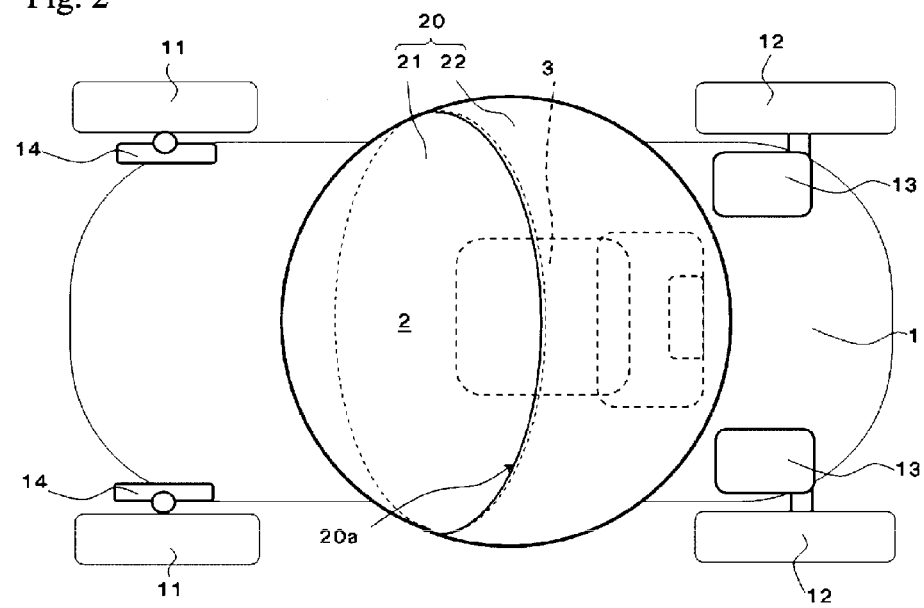
FIG. 2 A plan view of the entire compact vehicle.

As shown in FIG. 1 and FIG. 2, a compact vehicle, which is an electric car for example, includes a chassis frame 1 supporting front wheels 11 on the front side of the chassis frame 1, rear wheels 12 on the rear side of the chassis frame 1, a driving device 13 for driving the rear wheels, and a steering device 14 for steering the front wheels.

Arranged in the center of the chassis frame 1 is a passenger compartment 2 defined individually of the chassis frame 1, and a seat section protecting structure 22, which is a rear half of a passenger protecting structure 20 forming the outer shell of the passenger compartment 2, is supported on the chassis frame 1 so that the seat section protecting structure 22 can swivel on a swivel axis 24.

The passenger protecting structure 20 is divided into a front section protecting structure 21 (front half) and the seat section protecting structure 22 (rear half), and the only opening 20a for allowing the passenger to get on/off is formed along the plane of division between the front section protecting structure 21 and the seat section protecting structure 22.

In the passenger compartment 2, a single seat 3 in the width direction (lateral direction) of the vehicle, including a seat surface, a seat back and a headrest, is supported on the seat section protecting structure 22.

The lateral side and the upper side of the seat 3 are covered by the seat section protecting structure 22, forming the rear half of the passenger protecting structure 20, so as to protect the passenger during a collision from the side or a rollover.

Note that the opening 20a of the seat section protecting structure 22 is shut by the front section protecting structure 21 except when the passenger is getting on/off.

Although the opening 20a of the seat section protecting structure 22 does not need to be shut, it is shut by the front section protecting structure 21 in the present embodiment. This prevents the passenger from jumping out forward during a collision, and can also reserve the passenger compartment 2 as the survival space.

Figure 6:
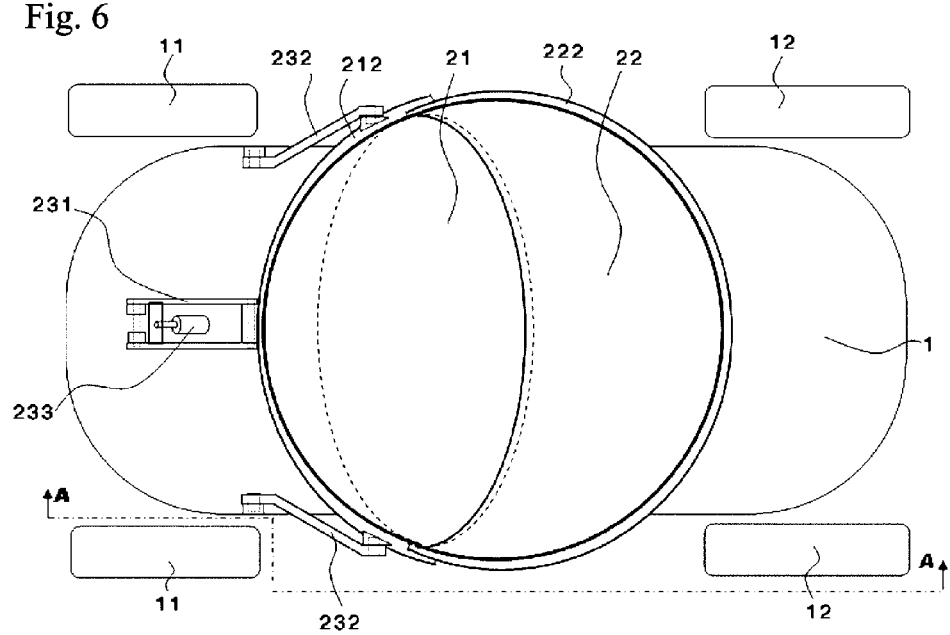
FIG. 6 A schematic plan view of the compact vehicle showing a support member for the front section protecting structure.
Figure 7:
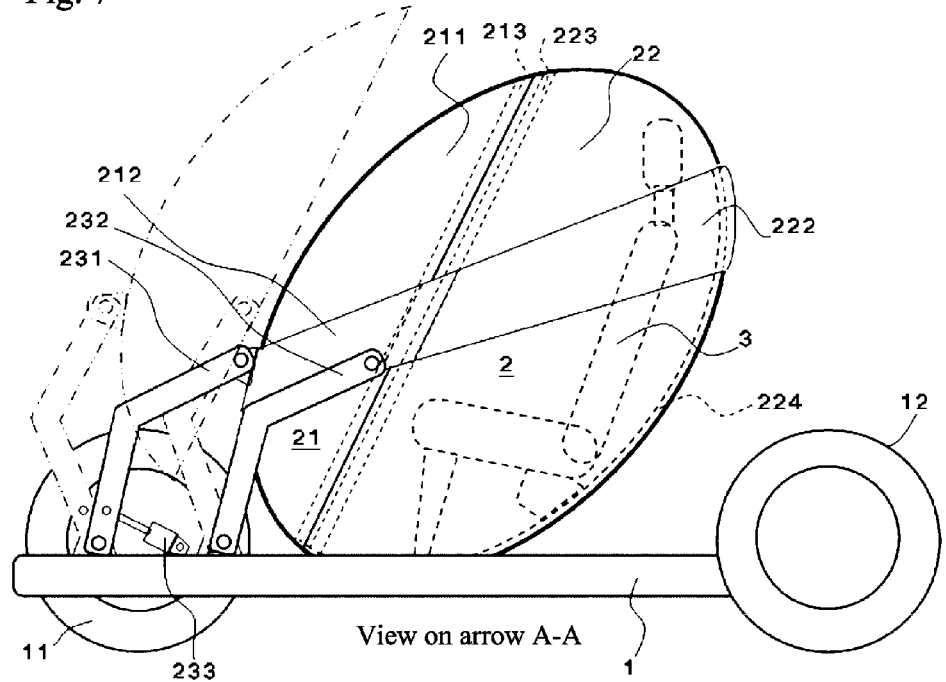
FIG. 7 A view on arrow A-A of FIG. 6 showing the front section protecting structure moving.

Note that although the front section protecting structure 21 can be attached to the seat section protecting structure 22 via a hinge so that it can be opened/shut, it is attached to the chassis frame 1 via support members 231 and 232 as shown in FIG. 6 and FIG. 7. This improves passenger accessibility, as it is not necessary to ensure a large space for opening a shutter member on the side of the vehicle when the seat section protecting structure 22 swivels and the passenger gets on/off.

Note that since the chassis frame 1, the driving device 13, the steering device 14, the suspension device (not shown), the braking device (not shown), etc., are of known structures, detailed descriptions will be omitted except for structures relating to the Present invention. The type of the chassis frame 1 may be of any structure selected from the ladder type, the panel type, the tubular type, and the like, as long as it is a crushable structure as will be described below capable of absorbing the energy of collision through deformation.

Note that the driving device 13 may be an internal combustion engine, and the left and right wheels may be driven by a single driving device. In the present embodiment, the driving devices 13 and 13, which are independent left and right electric motors, are arranged on the side of the rear wheels 12. Thus, the central portion of the body between the left and right wheels can be effectively utilized as a luggage compartment (not shown) or as a space through which the frame moves, and this also increases the rollover resistance of the vehicle by distributing the mass left and right.

The driving devices 13 may be arranged on the side of the front wheels 11, or the driving devices 13 may be arranged both on the side of the front wheels 11 and on the side of the rear wheels 12.

[Frame Moving Action]

Figure 3:
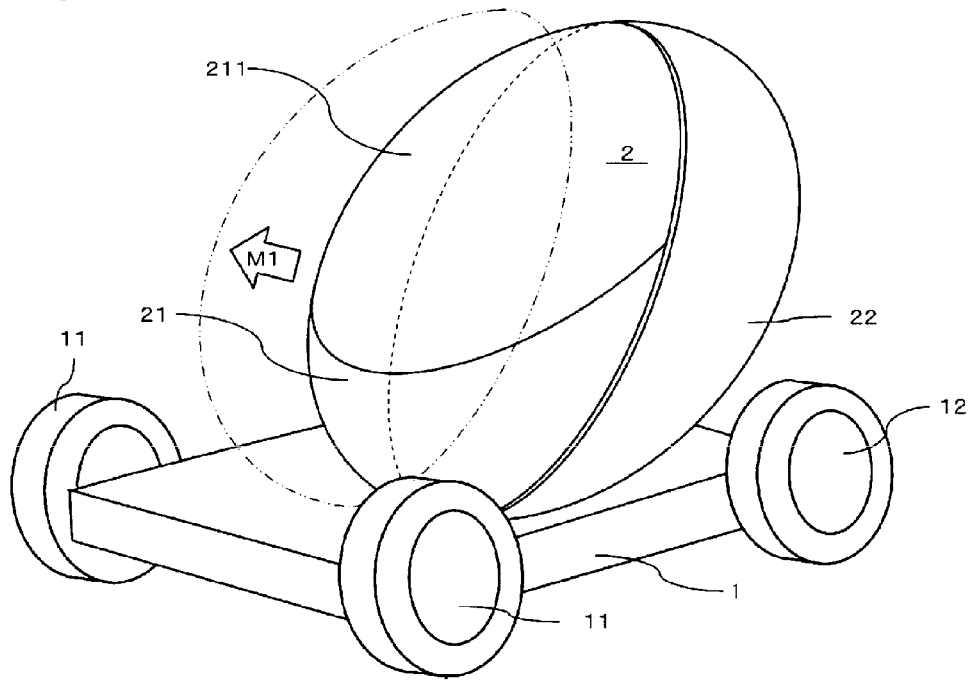
FIG. 3 A perspective view of the compact vehicle showing the forward movement of a front section protecting structure.
Figure 4:
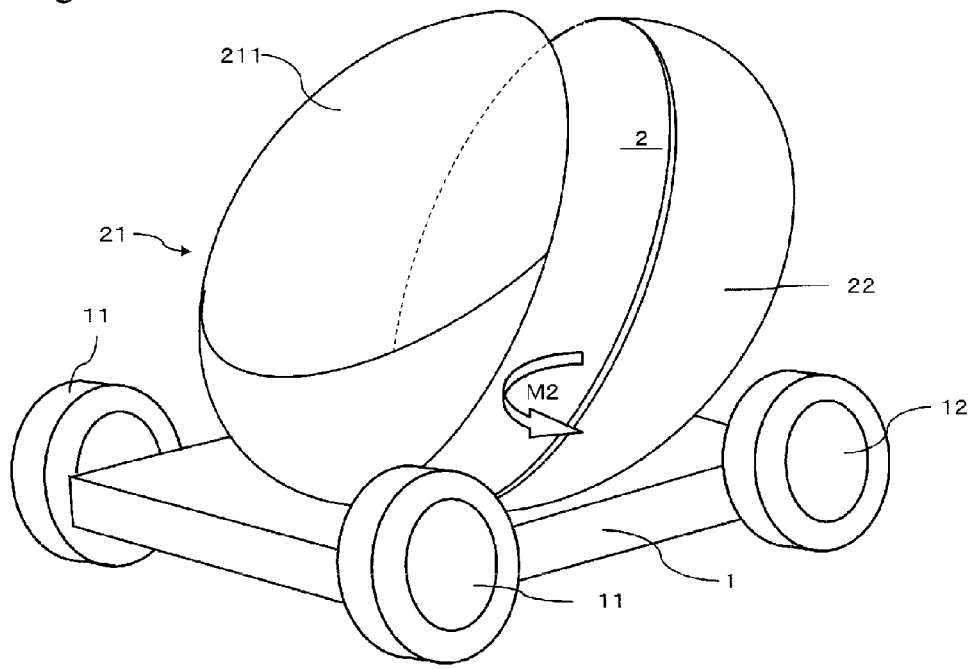
FIG. 4 A perspective view of the compact vehicle showing the swivel of a seat section protecting structure.
Figure 5:
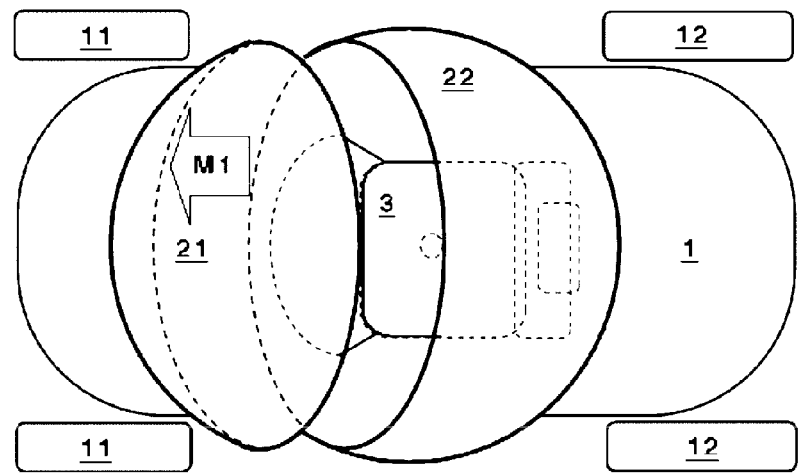
FIG. 5 A schematic plan view of the compact vehicle showing the movement of the front section protecting structure, the seat section protecting structure, and a seat.
Figure 5:
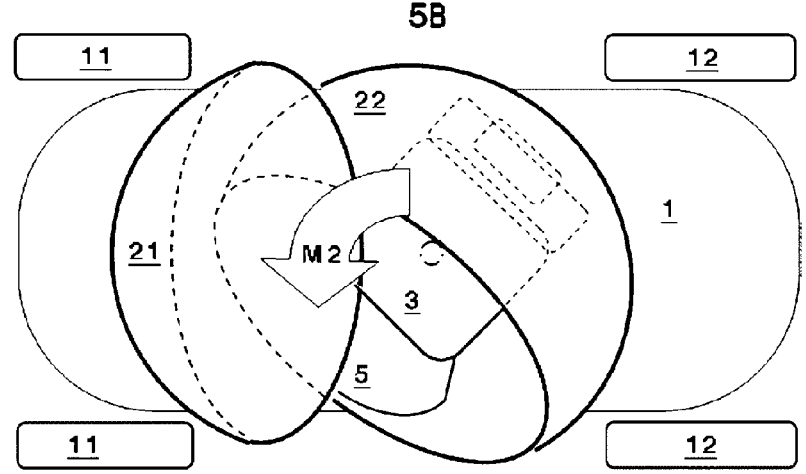
Figure 5:
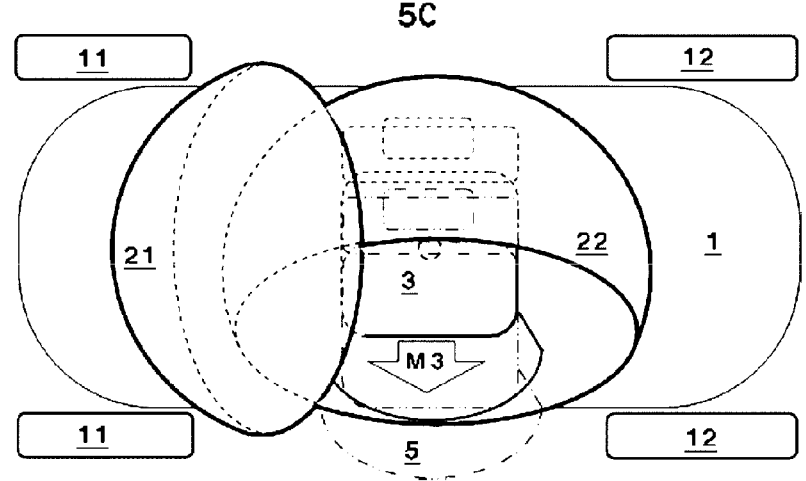

FIG. 3, FIG. 4 and FIG. 5 schematically show the action of the protection frame, wherein FIG. 3 is a perspective view showing a state where the front section protecting structure 21 and the seat section protecting structure 22 are coupled to each other. This is a state where the vehicle is running or is ready to run, or a state where the vehicle is parked except for when the passenger is getting on/off.

In this coupled position, in order to allow the passenger to get on/off, the coupling lock between the frames is first disengaged, and the front section protecting structure 21 is moved forward, as indicated by an arrow M1 in the figure, out of the range of swivel of the seat section protecting structure 22. Although the forward movement of the front section protecting structure 21 may be done through an operation in which the passenger manually pushes out the frame forward, it may be done by an actuator 233 of FIG. 7.

FIG. 4 shows a state where the coupling between the front section protecting structure 21 and the seat section protecting structure 22 has been disengaged and the structures have been separated from each other. In this separated position, the seat section protecting structure 22 swivels in the direction of an arrow M2 in the figure to a position where the passenger can get on/off from the side of the vehicle.

Note that while the front section protecting structure 21 may be fixed with respect to the chassis frame 1, and the seat section protecting structure 22 may be moved backward, together with the swivel axis 24 thereof, the front section protecting structure 21 is moved forward in the present embodiment. This only requires the swivel movement at the position near the center of gravity even when the seat section protecting structure 22 is under a heavy load with the passenger on board. Therefore, it is possible to simplify the structure, and to lower the capacity of the actuator 233 of FIG. 7 for moving the structure in the longitudinal direction.

Note that the front section protecting structure 21 includes a windshield 211 on top for ensuring a front visibility of the passenger.

The direction of swivel may be changed arbitrarily depending on the road regulations of each country (whether vehicles are driven on the left side or the right side).

FIG. 5 is a plan view also schematically showing the action of the passenger protecting structure 20, wherein FIG. 5A shows the separated position, showing a state where the front section protecting structure 21 has moved in the direction of the arrow M1 (the un-swiveled position). FIG. 5B shows a state where the seat section protecting structure 22 is swiveling in the M2 direction, and FIG. 5C shows a state where the seat section protecting structure 22 has swiveled (the swiveled position).

In the swiveled position of FIG. 5C, the seat 3 moves, together with a floor 5 on which the passenger can place his/her feet, in the M3 direction, forward of the opening of the seat section protecting structure 22 (the left side with respect to the vehicle running direction), thereby reaching a state where the passenger can get on/off with a comfortable posture, with nothing substantially protruding sideways.

Note that the mechanism for moving the seat 3 and floor 4 includes a known parallel link (not shown), a slide rail (not shown), and a seat moving actuator (not shown).

The series of actions for moving the passenger protecting structure 20 from the coupled position to the swiveled position is preferably done automatically in a sequential manner with an assist of an actuator by operating a button (not shown) provided at such a position that the button can be operated while the passenger is seated in the seat, or by operating a remote controller (not shown) carried by the passenger.

Note that while the series of actions for moving the passenger protecting structure 20 from the coupled position to the swiveled position is allowed to be done manually, it can be done automatically by an actuator under the following conditions.

Figure 14:
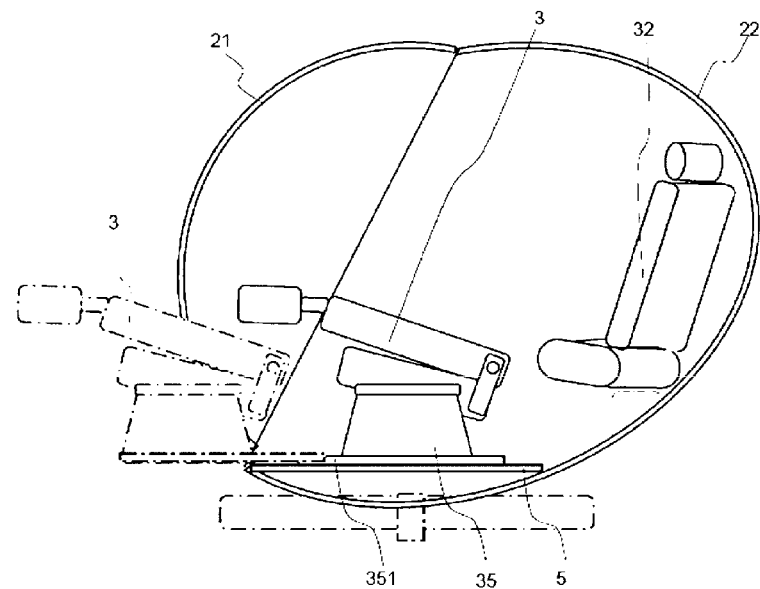
FIG. 14 A partial cross-sectional view showing the sliding movement of the seat according to the alternative embodiment.
Figure 15:
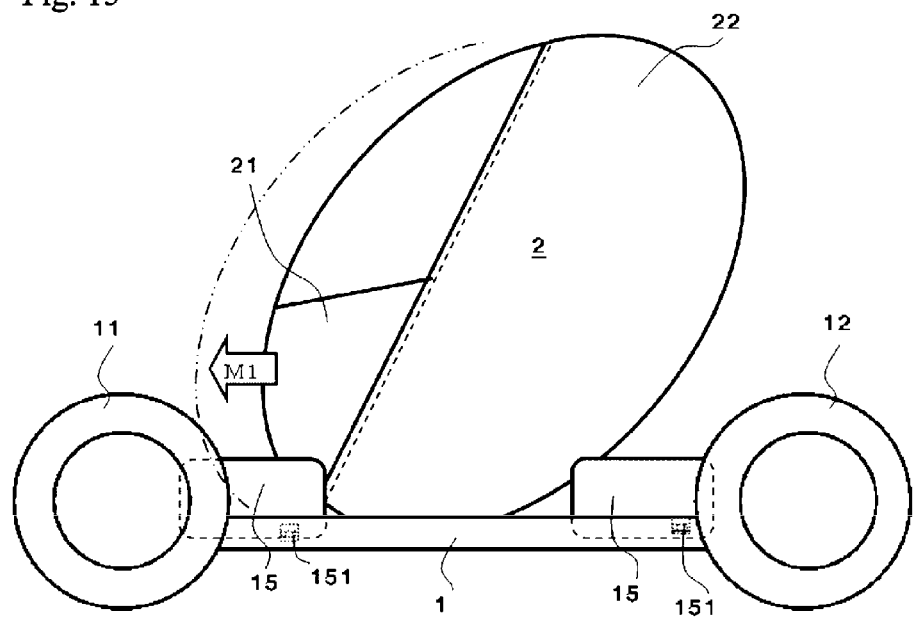
FIG. 15 A side view showing positions of battery protection cases in the compact vehicle.

<<Conditions for Movement from Coupled Position to Separated Position>>
Open button on remote controller or open button on vehicle=ON
Coupling lock=Disengaged
Vehicle speed=Zero
Drive motor stooped
Main switch=OFF
Parking brake=ON <<Conditions for Movement from Separated Position, Un-Swiveled Position to Swiveled Position>>
Limit switch for checking separated position=ON
At this point, as necessary, a vehicle side obstacle distance sensor (not shown) may be used to measure the distance from an obstacle, such as a neighboring vehicle on the side of the vehicle, for issuing a warning if an obstacle is present within the range of swivel of the seat section protecting structure 22. Particularly, for a large passenger compartment having a rear seat 32, since the amount of overhang upon swivel is large as shown in FIG. 14 and FIG. 15, it is effective to use a side distance sensor for the range of swivel.

Along with the swivel operation, steering handle locking means (not shown) for locking a steering handle 42 may be used to lock the steering handle 42, so that handle grips 43 can be used as assist grips when the passenger gets on/off.

<<Conditions for Movement from Swiveled Position to Un-Swiveled Position (Separated Position)>>
Open button on remote controller or open button on vehicle=ON
Limit switch for checking separated position of front section protecting structure 21=ON
At this point, as necessary, an obstacle sensor (not shown) for detecting the presence of an obstacle may be provided in the range of swivel of the seat section protecting structure 22 for issuing a warning if there is an obstacle.

Known pinch protection functions employed for power windows and sliding doors for vehicles may be provided.

Where the seat 3 has a sliding function, it is also a condition that the position of the seat 3 is within a predetermined range.

<<Conditions for Movement from Separated Position (Un-Swiveled Position) to Coupled Position>>
Limit switch for checking un-swiveled position=ON
At this point, as necessary, an obstacle sensor for detecting the presence of an obstacle may be provided in the range of movement for issuing a warning if there is an obstacle. Known pinch protection devices employed for power windows and sliding doors for vehicles may be provided.

Figure 9:
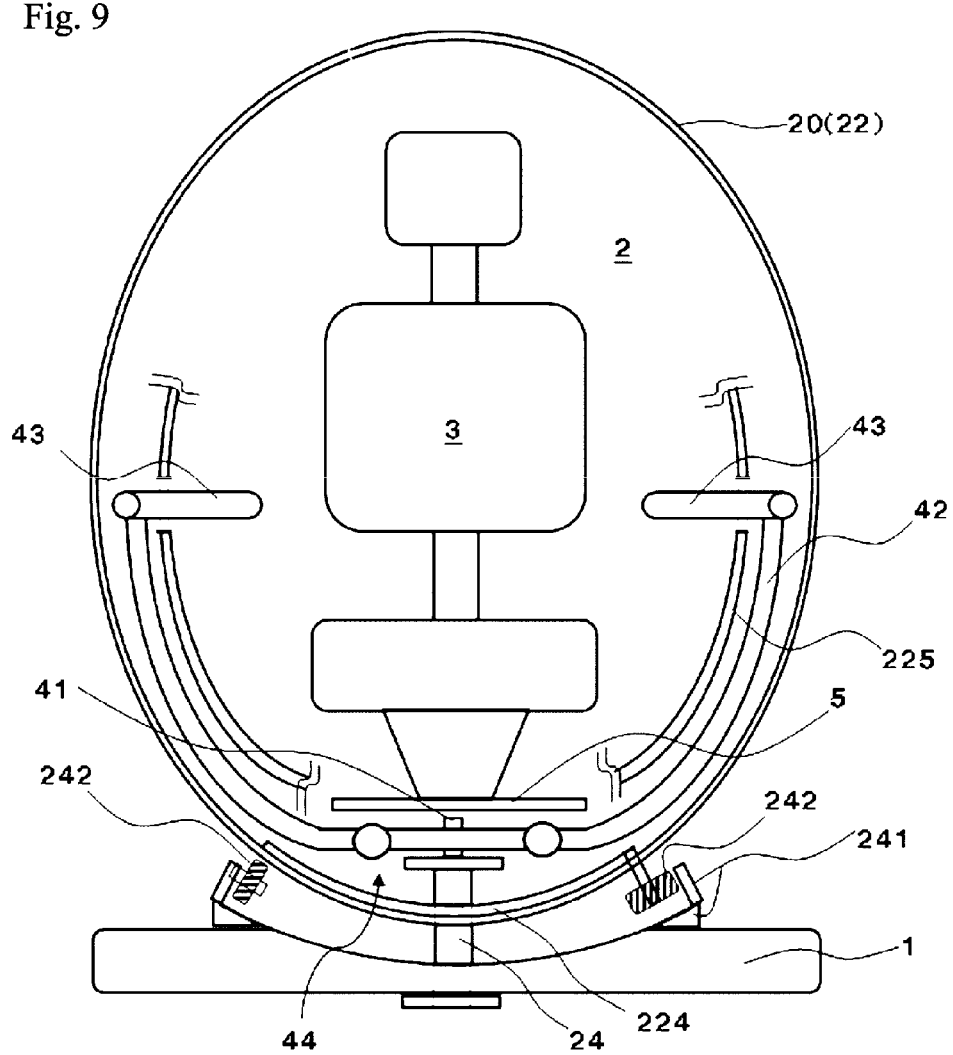
FIG. 9 A cross-sectional front view showing the inside of the seat section protecting structure, and the swivel axis.

<<Conditions for Activating Coupling Lock in Coupled Position>>
Limit switch for checking coupled position=ON <<Conditions for Starting Vehicle>>
Coupling lock state=Locked
Seating sensor=ON
Seatbelt worn
Steering handle lock disengaged The seat section protecting structure 22 of the passenger protecting structure 20 is supported on the chassis frame 1 via support members 24, 241 and 242 so that the seat section protecting structure 22 can swivel horizontally, as shown in FIG. 9. In the example of FIG. 9, a rail 241 and rollers 242 are provided between the chassis frame 1 and the seat section protecting structure 22 in order to distribute the load on the swivel axis 24 and to smoothly perform the swivel operation.

Note that with respect to the directions of the rollers 242, the example of FIG. 9 shows the roller 242 for receiving a load in the vertical direction and the roller 242 for receiving a load in the horizontal direction. However, any type may be employed as long as the swivel operation can be performed smoothly, receiving the load of the seat section protecting structure 22. The swivel operation may be performed by receiving the load of the seat section protecting structure 22 by means of only the rail 241 and the rollers 242, which are support members, and the swivel axis 24 may be eliminated.

While the angle of swivel is set to 90 degrees in the embodiment, an angle of swivel less than 90 degrees may be used as long as the passenger can get on/off.

Note that the impact strength of the support members 24, 241 and 242 for supporting the seat section protecting structure 22 on the chassis frame 1 is set to be lower than the impact strength of the passenger protecting structure 20 of the passenger compartment 2. Thus, it is possible to mitigate the transmission of an impact to the passenger compartment 2 even if the chassis frame 1 and the support members 24, 241 and 242 deform while absorbing an impact energy during a collision.

FIG. 6 and FIG. 7 show a link-type movement structure for the front section protecting structure 21, where the front section protecting structure 21 is supported by a front link 231 and a rear link 232, which are support members, on the chassis frame 1 so that the front section protecting structure 21 can be moved. The front link 231 and the rear link 232 each have a bent portion in an intermediate portion thereof, and are shaped so that even if the chassis frame 1 deforms so as to absorb an energy during a collision, the links 231 and 232 are likely to buckle at the bent portions so that the deformation will not influence the passenger protecting structure 20. The bent portions prevent the interference between the links 231 and 232 and the front section protecting structure 21 when the front section protecting structure 21 is moved forward.

The links 231 and 232, which are support members for the front section protecting structure 21, are coupled to the chassis frame 1 and the front section protecting structure 21 via elastic members (not shown) such as elastic bushes. Thus, it is possible to prevent noise and vibrations of the chassis frame 1 from being transmitted to the passenger compartment 2, and when the front section protecting structure 21 and the seat section protecting structure 22 are coupled to each other, an excessive force will not be applied even if there is some misalignment because of the compliance effect, thereby enabling smooth coupling/de-coupling actions.

Note that the impact strength of the links 231 and 232, which are support members for supporting the front section protecting structure 21 on the chassis frame 1, is set to be lower than the impact strength of the passenger protecting structure 20 of the passenger compartment 2. Thus, it is possible to mitigate the transmission of an impact to the passenger compartment 2 even if the chassis frame 1 and the support members 231 and 232 deform while absorbing an impact energy during a collision.

[Shape/Material of Frame]

The passenger compartment 2 is formed in the space surrounded by the passenger protecting structure 20. The passenger protecting structure 20 is made up of the seat section protecting structure 22 and the front section protecting structure 21, and has an egg-shaped stressed skin structure as a whole. The passenger protecting structure 20 is formed in a generally elliptical shape formed by a continuous courve made up of cross sections thereof on two planes intersecting orthogonal to each other along a straight line passing through the passenger compartment 2. Thus, an external load can be received in a distributed manner across a surface, and there is no partial folding point at which stress would localize. Therefore, even if a thin outer shell is used to reduce the weight, it is possible to ensure a required impact strength. By forming the outer shell at least partially with a resin material including a polycarbonate resin having a desirable impact resistance, it is possible to realize the passenger protecting structure 20 that has a light weight and a desirable strength. Also, with the light-transmitting nature of the polycarbonate resin, the inside of the passenger compartment 2 can be made bright.

Note that a resin material reinforced with a fiber material can be employed as a resin material including a polycarbonate resin. Particularly, the strength of the opening 20a can be enhanced effectively if the fiber orientation is along the circumferential direction of the opening 20a of the passenger protecting structure 20.

A known resin material mixed with a polyester resin may be employed as a resin material including a polycarbonate resin, achieving a desirable moldability, dimensional precision, and external appearance.

Note that a structure formed by a resin is manufactured by injection molding, and the seat section protecting structure 22 is formed separately as an upper half and a lower half so that there is no undercut portion. Since the front section protecting structure 21 has no undercut, it can be formed as an integral part using a transparency material, coloring some parts as necessary. However, if the windshield 211 part and a lower half are molded separately, it is possible to select the material, thickness and strength, as necessary.

[Sub-Frame]

In FIG. 6 and FIG. 7, the passenger protecting structure 20 includes subframes 212, 213, 222, 223 and 224.

The seat section protecting structure 22, forming the rear half of the passenger compartment 2, includes the rear horizontal sub-frame 222, the vertical sub-frame 223 for reinforcing the opening 20a on the front side of the seat 3, and the lower sub-frame 224 whose front end is connected to the vertical sub-frame 223 and whose rear end is connected to the rear horizontal sub-frame 222.

The rear horizontal sub-frame 222 has a generally arc-shaped, being open on the front side, as viewed from above, extending from behind the seat and covering the left side and the right side, with its left and right end portions connected to a vertical intermediate portion of the vertical sub-frame 223, and the rear horizontal sub-frame 222 is connected to the lower sub-frame 224 on the rear side.

Figure 18:
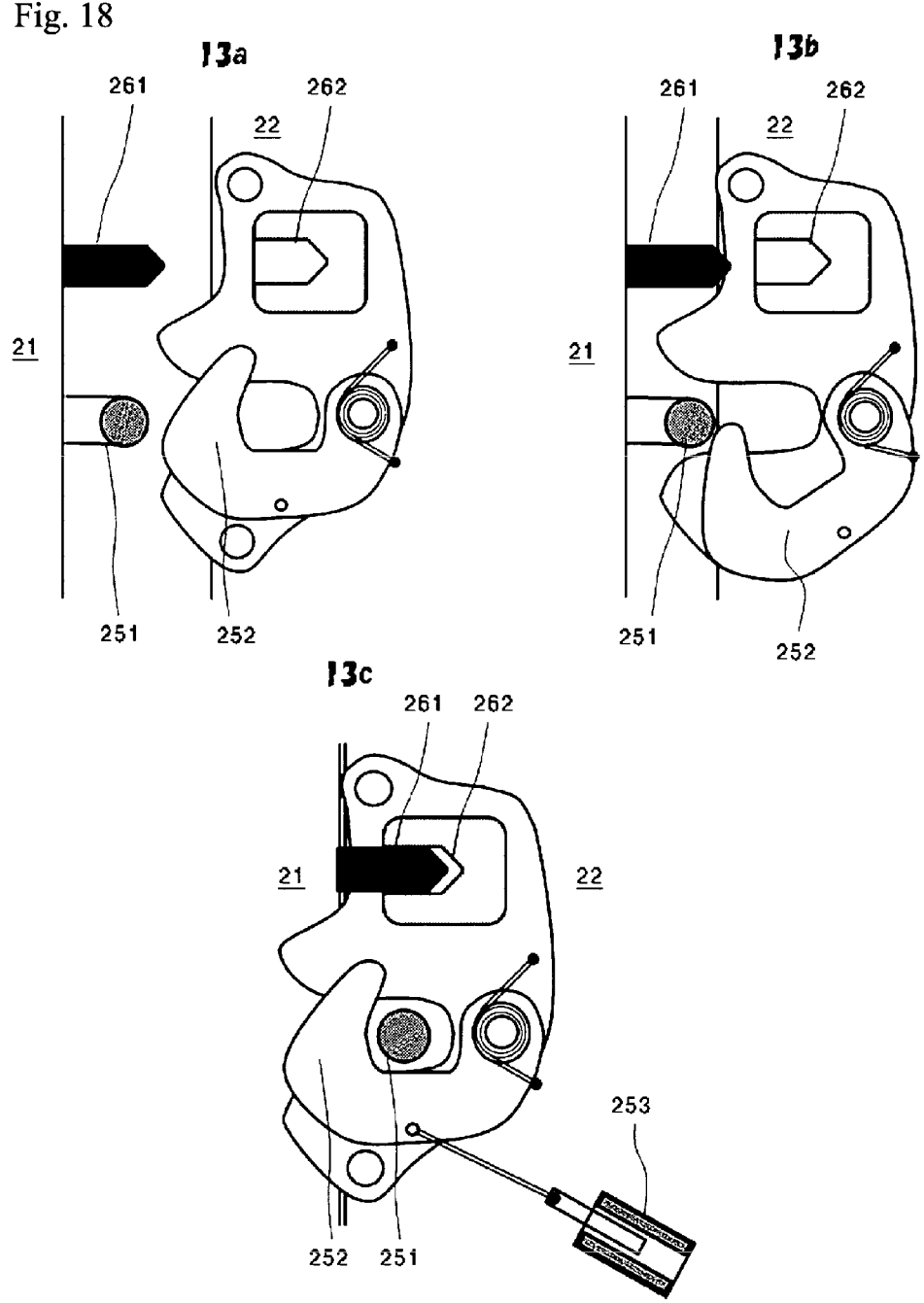
FIG. 18 An enlarged view of an important part, showing the action of coupling lock means between the front section protecting structure and the seat section protecting structure.

The vertical sub-frame 223 is formed in a ring shape for reinforcing the opening 20a on the front side of the seat section protecting structure 22, with its vertical intermediate portions connected to the rear horizontal sub-frame 222, and its lower end portion connected to the lower sub-frame 224. Moreover, coupling lock means 25 for coupling together the seat section protecting structure 22 and the front section protecting structure 21, a lock actuator 253, positioning means 26 for regulating the position of the coupled portion with the opening 20a of the seat section protecting structure 22, and coupled position guide means (not shown) are arranged at a plurality of positions along the ring-shaped vertical sub-frame 223 (see FIG. 18, though positions of arrangement are not shown).

In order to ensure side and rear visibility of the passenger, the outer shell is formed by using a transparent polycarbonate resin in the area behind the vertical sub-frame 223 and above the rear horizontal sub-frame 222.

The front end of the lower sub-frame 224 is connected to the vertical sub-frame 223 and the rear end thereof is connected to the rear horizontal sub-frame 222, and the intermediate portion thereof supports parts that need to have relatively large bearing loads, such as the swivel axis (bearing) 24 of the seat section protecting structure 22, the seat 3, and a steering post 41.

The front section protecting structure 21 includes the front horizontal sub-frame 212 and the vertical sub-frame 213.

The front horizontal sub-frame 212 is arc-shaped, being open on the rear side, as viewed from above, and the front portion of the front horizontal sub-frame 212 is supported by the link 231 on the front side, and the left and right rear ends are supported by the link 232. The left and right rear end portions are arranged at such a height that they are continuous with the front ends of the rear horizontal sub-frame 222.

The front horizontal sub-frame 212 is connected to the vertical intermediate portion of the vertical sub-frame 213, and the semi-flattened dome-shaped transparent windshield 211 is provided above the front horizontal sub-frame 212 and on the front side of the vertical sub-frame 213.

In order to be coupled to the vertical sub-frame 223 located along the opening 20a on the front side of the seat section protecting structure 22, the vertical sub-frame 213 of the front section protecting structure 21 includes a striker 251, a tapered pin 261 and guided means (not shown), which are provided at a plurality of positions along the circumferential direction so as to correspond to a hook 252 of the coupling lock means 25 and a tapered hole 262 of the positioning means 26 along the vertical sub-frame 223. (see FIG. 18)

Note that each sub-frame is manufactured by using a metal material or a resin material while partially thickening or reinforcing it with fibers as necessary. While the sub-frame and the resin material of the outer shell may be coupled together via a mechanical means such as bolts, a metal frame may be provided by insert molding during the resin molding process.

While the lower half of the seat section protecting structure 22 needs to be strong in order to support the swivel axis 24, the seat 3, the steering handle 42, the floor 5, etc., the lower sub-frame 224 may be formed by two left and right parallel pipes (not shown) coupled together by cross bars (not shown), or the resin material may be partially thickened or reinforced with fibers as necessary to thereby ensure the required strength.

Figure 8:
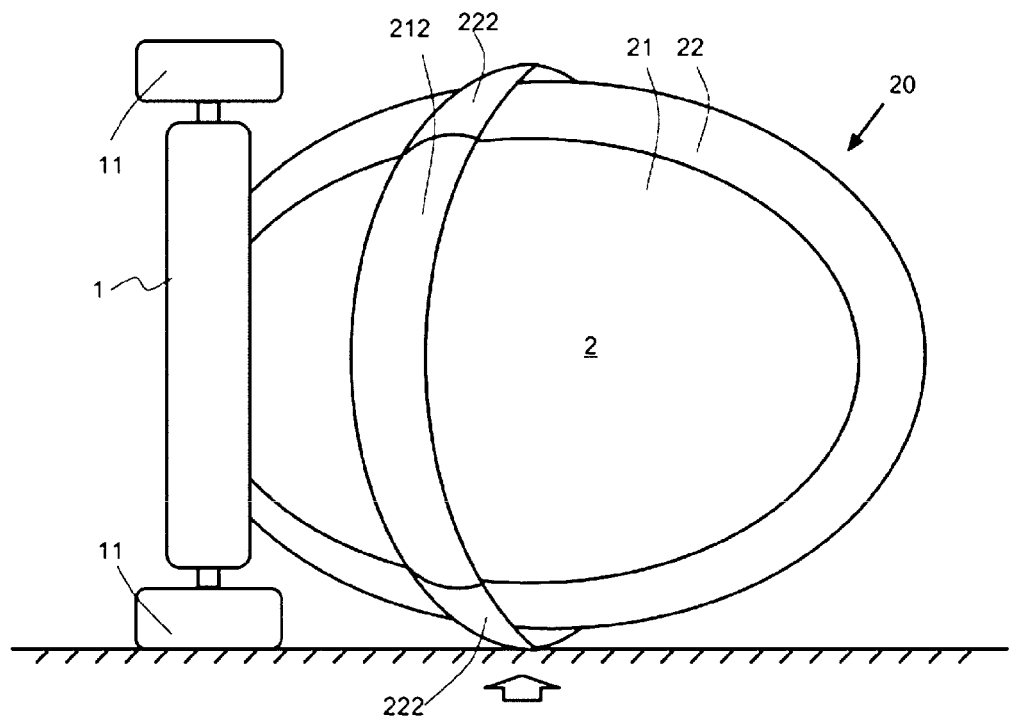
FIG. 8 A front view showing the vehicle having rolled over.

FIG. 8 is a front view showing the vehicle having rolled over, where it can be seen that the vehicle is in contact with the ground via the front wheels 11 and the outermost portion of the rear horizontal sub-frame 222 of the seat section protecting structure 22. If a stressed skin structure receives a locally strong force, that portion easily deforms or breaks. However, the portion to be in contact with the ground in the case of a rollover is protected by the rear horizontal sub-frame 222, which disperses the stress from the ground, thereby making it possible to prevent the passenger protecting structure 20 from breaking in the case of a rollover.

[Steering Handle]

Figure 10:
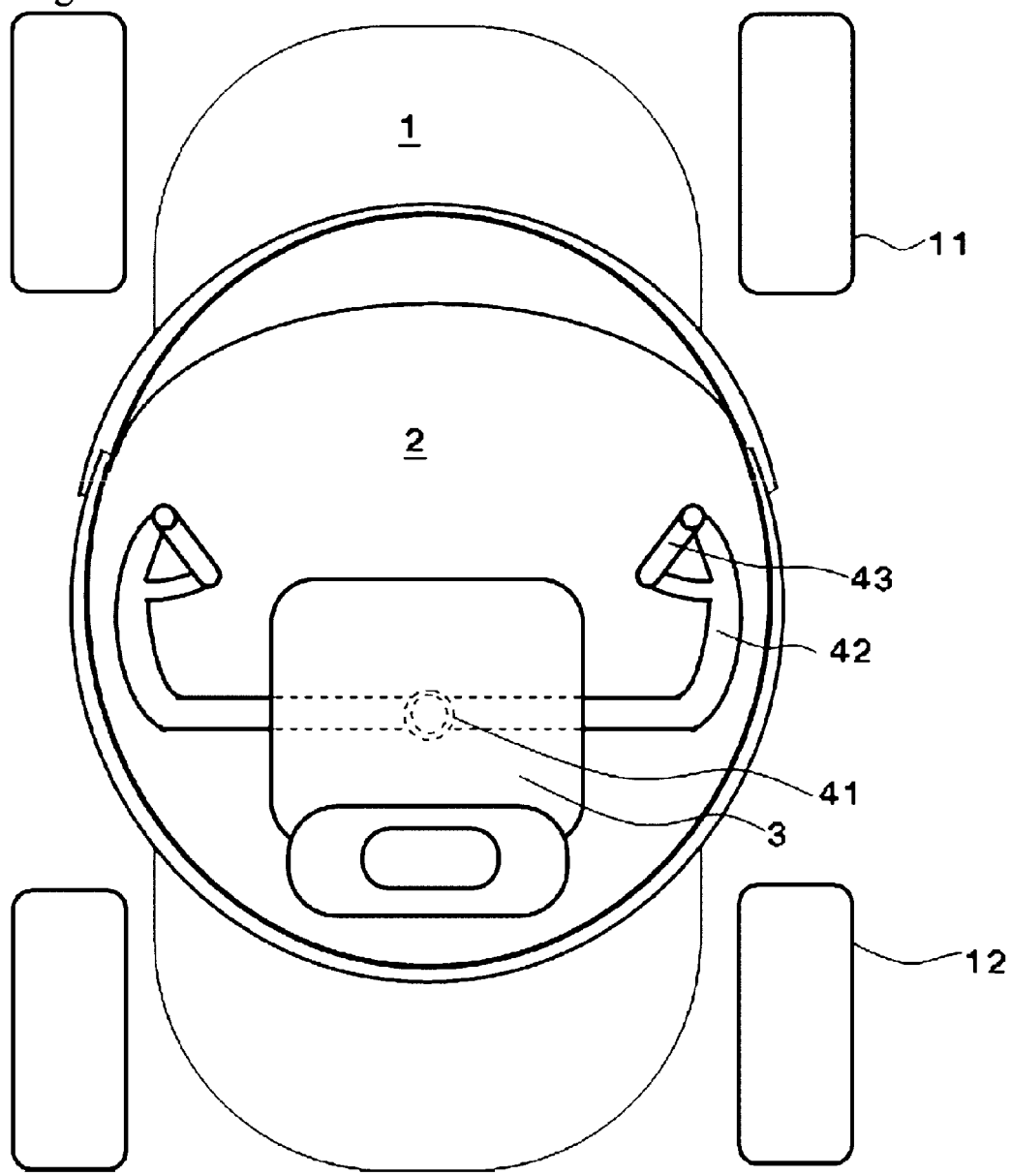
FIG. 10 A schematic cross-sectional plan view of a passenger protecting structure showing the steering handle position.
Figure 11:
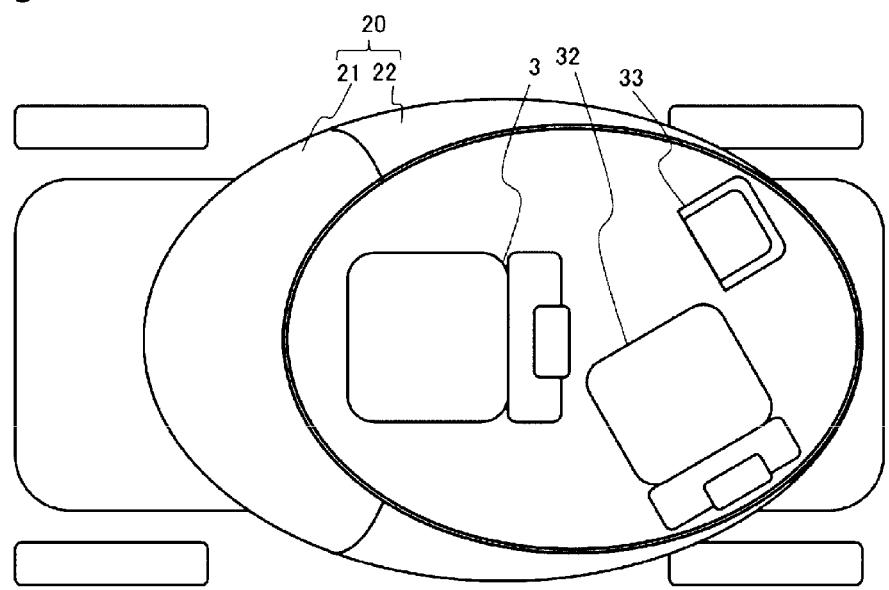
FIG. 11 A schematic cross-sectional plan view of a vehicle showing a seat arrangement according to an alternative embodiment.
Figure 12:
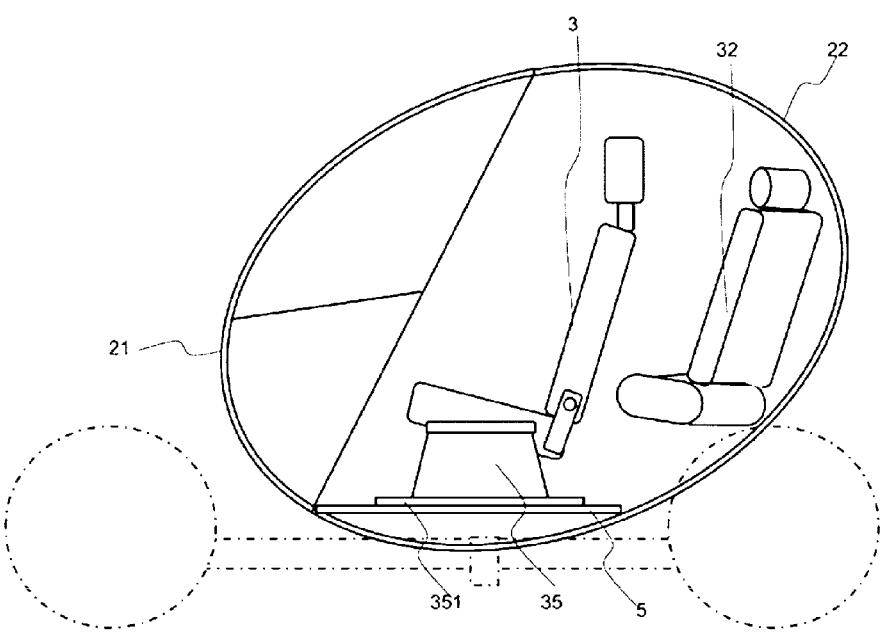
FIG. 12 A cross-sectional side view of the alternative embodiment.

FIG. 9 and FIG. 10 show the arrangement of the steering handle 42 provided in the seat section protecting structure 22. As shown in FIG. 9, the steering handle 42 is supported so that it can pivot about the generally vertical axis of the steering post 41 attached at the center of the seat section protecting structure 22 in the left-right direction under the floor 5. The steering handle 42 diverges from the steering post 41 sideways left and right, extending upward between the left and right inner walls of the seat section protecting structure 22 and an interior cover 225 along the arc-shaped inner walls, and then extending inwardly through slit-shaped openings in the interior cover 225, with the handle grip 43 provided on each upper end portion.

As shown in FIG. 10, the handle grips 43 are arranged separately left and right in the opening 20a of the passenger protecting structure 20.

Therefore, the steering handles 42 will not hinder the swivel operation of the seat section protecting structure 22. Since the front side of the seat 3 is opened in the swiveled position, the steering handles 42 will not hinder the passenger from getting on/off, and will not hinder the passenger from moving the seat 3 back and forth for getting on/off. When driving, the passenger can hold them with bent elbows, and can therefore steer around in a comfortable posture. Since the tip is formed in a loop shape, there is no tip projecting as with a bar handle, and it is safe and easy to grip, and it also functions as an assist grip when getting on/off.

Note that the angle of the steering handle 42, the vertical position thereof, the amount of inward protrusion thereof can be adjusted by known methods so as to conform to the physique of the driver.

The slit-shaped openings of the interior cover 225 are provided with slide covers (not shown) capable of moving following the movement of the steering handle 42.

Note that while an acceleration instruction device (not shown) and a deceleration instruction device (not shown) may be provided at any positions near the handle grip 43, the deceleration instruction device may be provided as a brake pedal (not shown) on the floor 5.

The brake pedal may include a parking lock, and an interlock means may be further provided for allowing/enabling the movement of the front section protecting structure when the parking lock is engaged.

Figure 19:
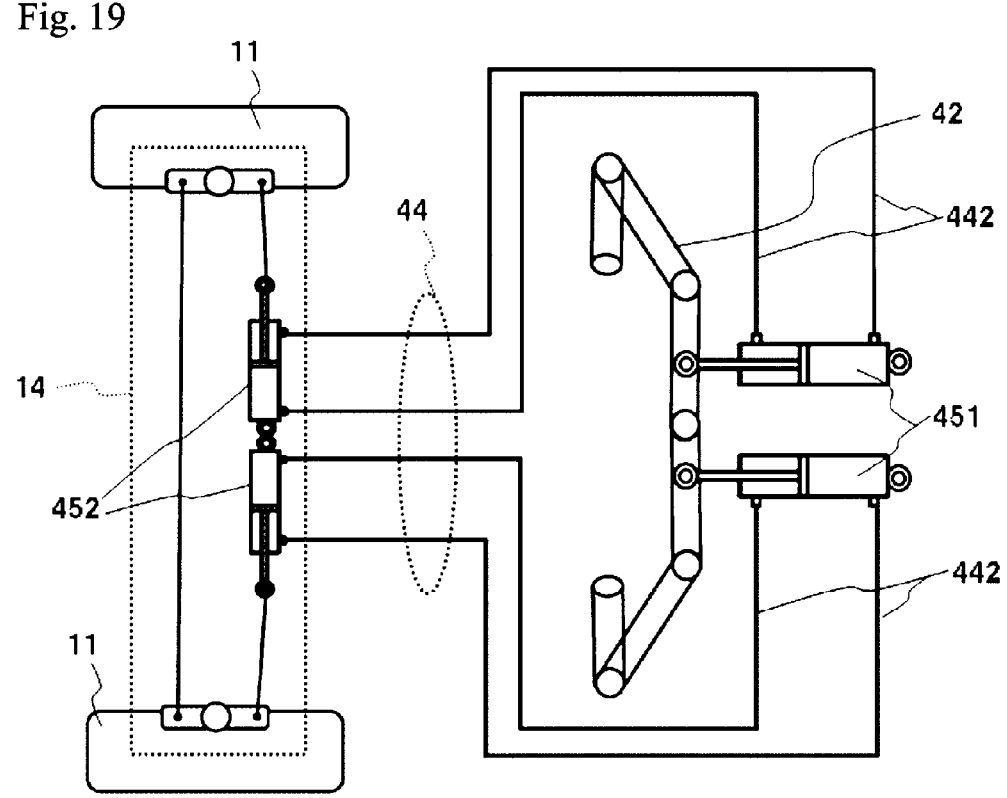
FIG. 19 A schematic diagram showing a hydraulic steering mechanism.
Figure 20:
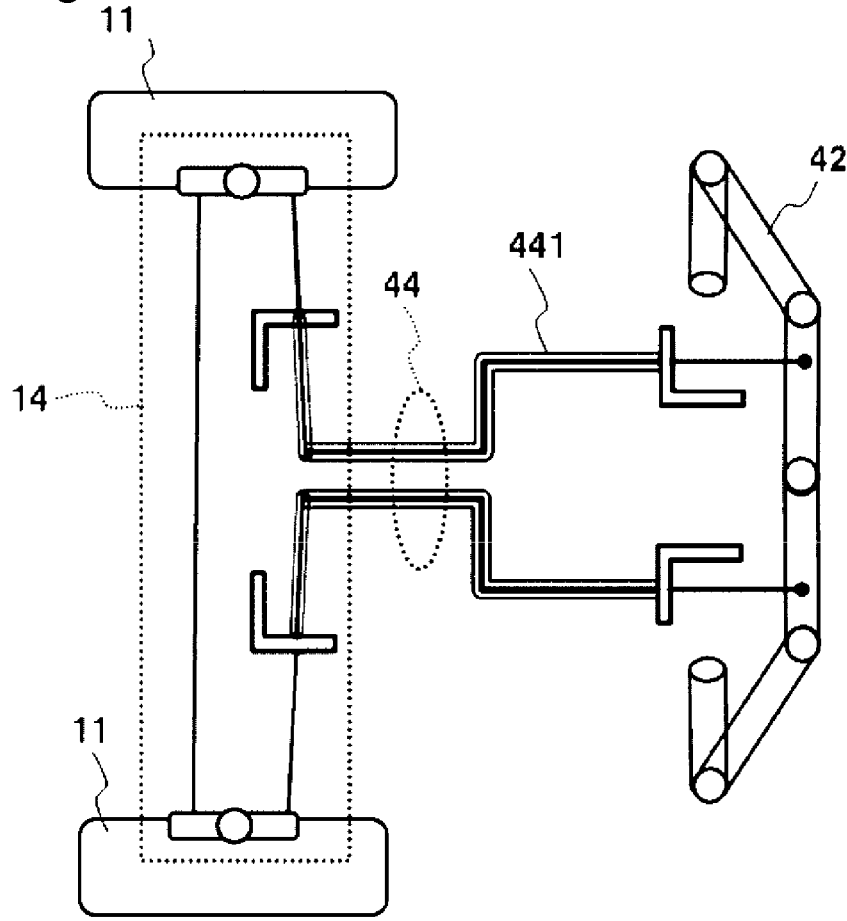
FIG. 20 A schematic diagram showing a mechanical steering mechanism.

FIG. 19 and FIG. 20 show steering force transmitting means 44 for transmitting a steering force from the steering handle 42 to the steering device 14 of the front wheels 11, wherein FIG. 19 is an embodiment where the steering force is transmitted hydraulically, and FIG. 20 is a mechanical embodiment using Bowden wires.

In the case of a hydraulic type, a hydraulic pressure is generated by a hydraulic piston 451 coupled to the steering handle 42, and the steering force is transmitted to a hydraulic actuator 452 of the steering device 14 of the front wheels via a hydraulic hose 442. The steering device 14 of the front wheels is of a known structure, where the left and the right are coupled together by a relay rod.

In the case of a mechanical type, the steering force is transmitted to the steering device 14 of the front wheels 11 by Bowden wires 441 coupled to the steering handle 42.

Note that since the steering force transmitting means 44 is routed so as to pass through the vicinity of the center of the swivel axis 24, the hydraulic hose 442 or the Bowden wire 441 will not be twisted or pulled by the swivel operation.

Since the steering force transmitting means 44 provides the transmission to the steering device 14 independently for the left and right routes, the steering operation can be continued even if one of the transmission routes has a problem, for example.

Note that the steering force transmitting means 44 may be by-wire (electric), or a combination of a hydraulic means, a mechanical means, and an electric means.

[Seat]

The movement of the seat for allowing the passenger to get on/off in the swiveled position will be described with reference to an embodiment where a rear seat is provided, shown in FIG. 11 to FIG. 14. The compact vehicle shown in FIG. 11 and FIG. 12 includes: a single driver seat 3 in the lateral direction; a passenger rear seat 32 arranged behind the driver seat 3 while being offset to the left with respect to the center of the vehicle as viewed from above, facing forward in a direction inclined to the right with respect to the vehicle running direction; and a detachable child seat 33 opposing the passenger rear seat 32. Since the passenger rear seat 32 is arranged diagonally, the length of the passenger compartment in the longitudinal direction can be made short, and it is possible to create a rear seat space within a small space with little sense of oppression, by ensuring a space beside the passenger's shoulders and ensuring a space with no protruding objects in front of the passenger's eyes. Another advantage is that there is an extra room also around the passenger's knees so that the passenger can be seated in a comfortable posture.

Since the child seat 33 is provided detachable in front of the diagonally-arranged passenger rear seat 32, the passenger can keep an eye on a child seated in the child seat 33. Moreover, since the height of eye line of the passenger can be substantially the same as the height of eye line of the seated child, it is possible to give a sense of safety both to the passenger and to the child.

Note that the present embodiment is otherwise similar to the embodiment of the one-seater compact vehicle.

Figure 13:
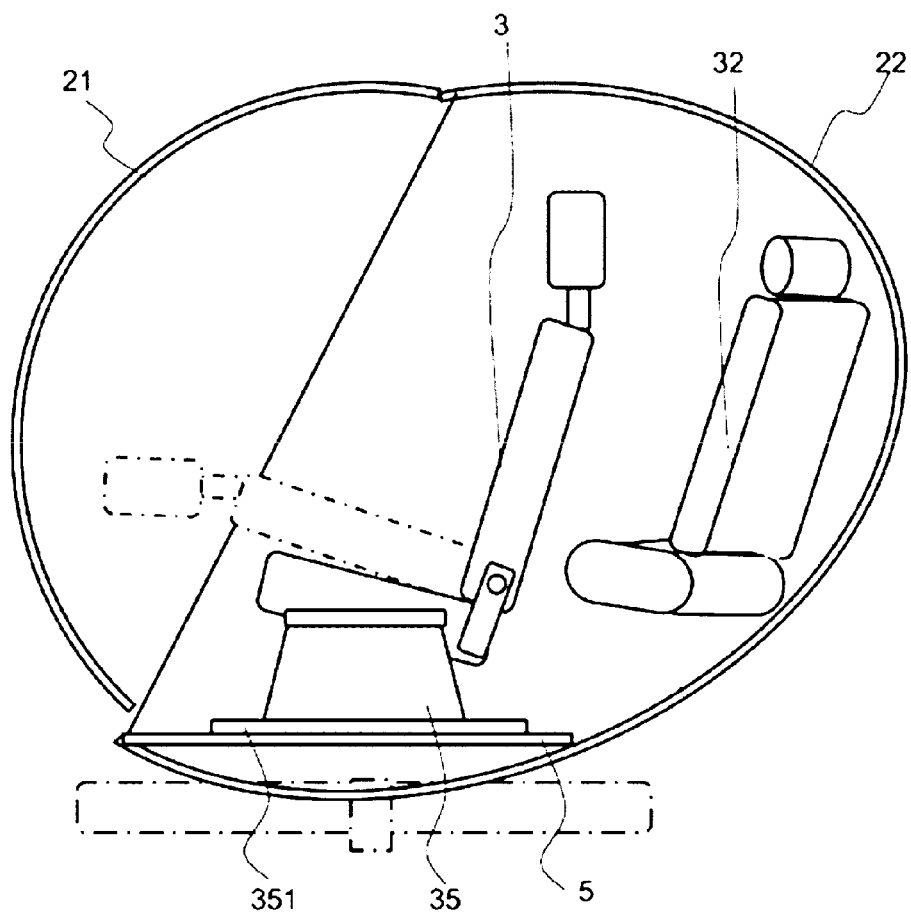
FIG. 13 A partial cross-sectional view showing the action of the seat when the passenger protecting structure is in a swiveled position according to the alternative embodiment.

FIG. 13 and FIG. 14 show the movement of the seat 3 in the swiveled position, where the seat 3 is supported, together with the floor 5, on the seat section protecting structure 22.

The seat back of the seat 3 can be folded forward via a hinge behind the seat surface, and the seat 3, with its seat back folded, can be slid on a slide rail 351 toward the direction of the opening 20a of the seat section protecting structure 22, thereby creating a space in the opening 20a through which a passenger can pass, thus allowing the passenger to get on/off the rear seat 32. Note that while this embodiment has illustrated a configuration where the seat is slid on the slide rail 351, a hinge (not shown) may be provided in front of a seat support member 35 so that the seat can pivot, or the seat support member 35 may be allowed to be translated by a link (not shown), for example.

While the present embodiment is directed to an example where a passenger gets on/off the rear seat 32, the seat may be moved forward and backward to allow the driver to get on/off, and the seat 3 may be driven by an actuator (not shown).

With such a configuration, the seat moves toward the direction of the opening of the seat section protecting structure in the swiveled position. Therefore, the seat can be moved by a greater distance since there is no obstacles in front, such as the handle steering or the dashboard, as in a conventional compact vehicle, thus improving accessibility to the back side over the seat 3.

[Battery]

Next, the arrangement of the battery, and the protection thereof during a collision will be described based on FIG. 15, FIG. 16 and FIG. 17.

Figure 16:
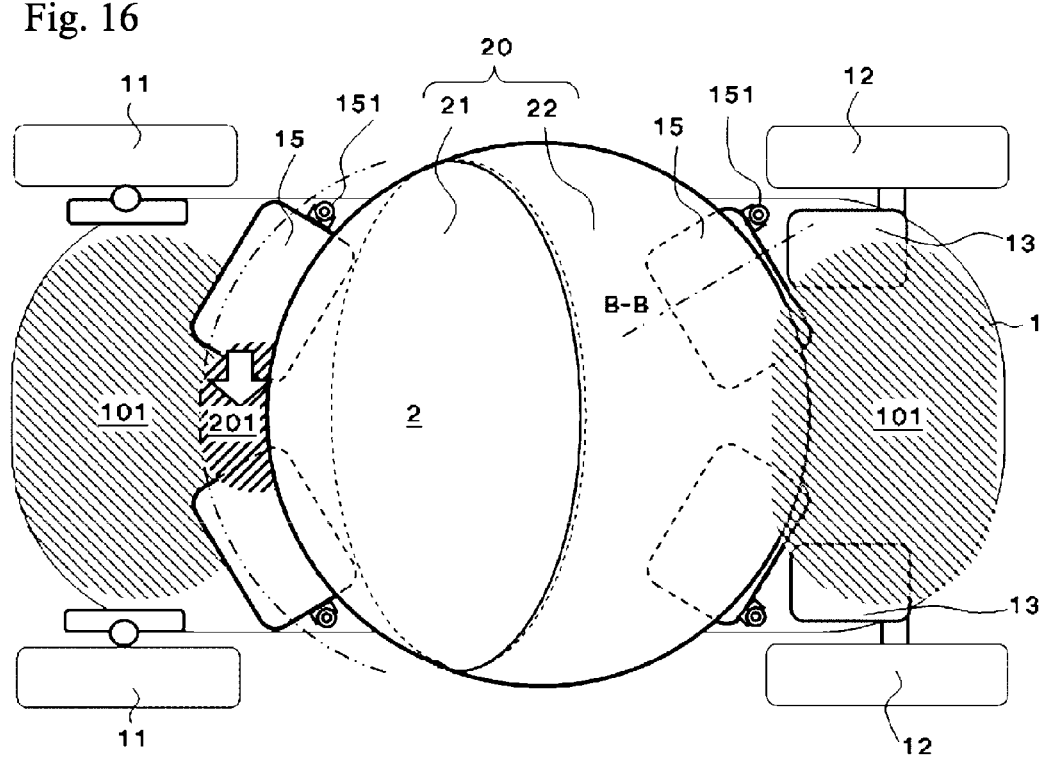
FIG. 16 A plan view showing positions of battery protection cases in the compact vehicle.

In the embodiment shown in FIG. 15 and FIG. 16, a battery protection case 15 that is arranged on the front side of the passenger protecting structure 20 is arranged on the chassis frame 1 via a battery support member 151 between the inner rear side of the front wheels 11 and the passenger protecting structure 20.

The front section protecting structure 21, which forms a front portion of the passenger protecting structure 20, is supported on the chassis frame 1 so that it can be moved in the longitudinal direction between the coupled position and the separated position with respect to the seat section protecting structure 22, and a structure moving space area 201 for allowing the front section protecting structure 21 to move between the coupled position and the separated position is provided on the inner side of the front wheels 11 above the chassis frame 1.

The structure moving space area 201 shares a space with a crushable zone 101 in which the chassis frame 1 can deform upon a head-on collision or a rear-end collision of the vehicle so as to absorb the impact energy upon collision.

The battery support member 151 of the battery protection case 15 includes fastening members such as brackets and bolts, and the impact strength is set so that the battery support member 151 deforms or breaks to allow the battery protection case 15 to move in order to absorb the impact on the battery protection case 15 upon collision.

The impact strength of the battery support member 151 can be adjusted by any known method, it can be done by, for example, forming a weak portion in the bracket.

Note that an impact strength greater than or equal to the strength of the battery support member 151 is ensured for the battery protection case 15 so that the battery protection case 15 is not broken by the impact upon collision.

With such a configuration as described above, if the vehicle undergoes a collision on the right side surface thereof, for example, the battery protection case 15 on the front right side of the vehicle moves toward the center (in the direction indicated by an arrow in FIG. 16) in response to the impact of collision. The moving space area 201 for the battery protection case 15 is a space normally reserved as the structure moving space area 201 for allowing the front section protecting structure 21 to move therethrough. Thus, it is possible to efficiently utilize the space, and it is possible to prevent the battery protection case 15 from being damaged by being pinched between other structure members.

Since the high-voltage battery is arranged outside the passenger compartment 2, it is possible to ensure safety of the passenger even if the battery protection case 15 breaks by a level of impact over expectations.

Note that the hatched area 101 of FIG. 16 is a crushable zone for head-on collision, and the crushable zone 101 also shares a space with the moving space area 201 for the front section protecting structure 21.

Battery protection cases 15 that are arranged on the rear side of the passenger protecting structure 20 are arranged on the chassis frame 1 in a distributed manner in left-right symmetry, between the front side beside rear wheels and the passenger protecting structure 20 via the battery support members 151, with its longitudinal axis being diagonal with respect to the longitudinal center line of the vehicle.

As the battery protection cases 15 are arranged diagonally while overlapping with the passenger protecting structure 20 as viewed from above and are arranged so as to overlap with the outer profile of the rear wheels 12 and the seat section protecting structure 22, which is the rear half of the passenger protecting structure 20, as viewed from the side, it is possible to efficiently utilize the space below and beside the passenger protecting structure 20 and on the inner side of the rear wheels 12.

With the diagonal arrangement, when detaching/attaching the battery protection case 15 for battery maintenance, the battery protection case 15 can be removed from the side of the vehicle in a diagonally forward direction without having to remove the rear wheels 12.

Moreover, since the battery protection cases 15 are distributed left and right, the inertial force of the vehicle in the roll direction is increased, and it is possible to increase the resistance against rollover even with a vehicle with a narrow tread.

Figure 17:
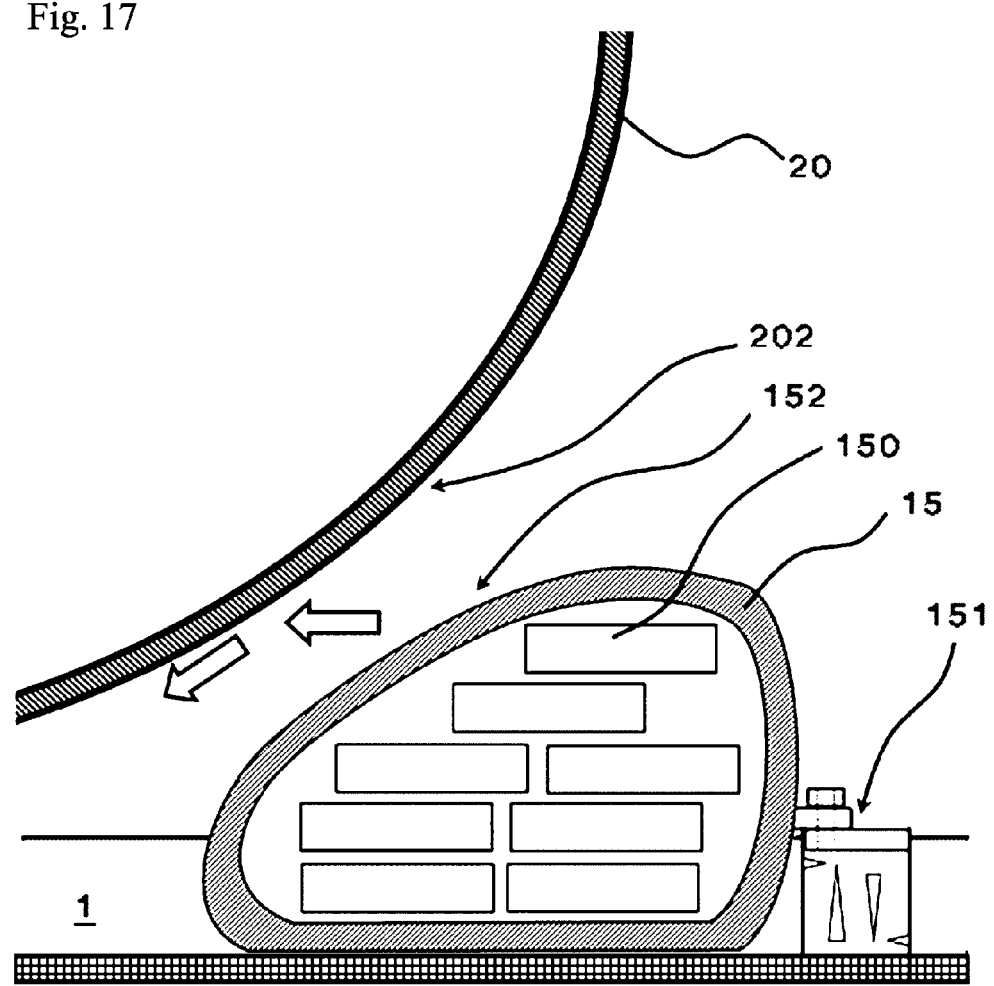
FIG. 17 A cross-sectional view, taken along line B-B of FIG. 11, showing an inclined wall surface of the passenger protecting structure, and a battery protection case.

FIG. 17 shows an important part of the B-B cross section of FIG. 16. The lower portion of the passenger protecting structure 20 has a hemispherical cup shape, which forms a slope 202 in a lower outer portion of the passenger protecting structure, the slope 202 inclined upwardly away from the center of the vehicle.

The battery protection case 15 accommodates therein a plurality of batteries (cells) 150 stacked on one another, and includes a space or a shock-absorbing material (not shown) between the inner wall surface of the battery protection case 15 and the batteries 150, as necessary, so as to protect batteries 150 from an external impact.

Also provided are a harness (not shown) for supplying power required for the driving device 13, and a connector (not shown) for connecting the harness, and the driving device 13 is driven via a control device (not shown) arranged at an appropriate position on the chassis frame 1.

The battery protection case 15 is formed by a metal or a resin material and has a strength such that the batteries 150 inside the battery protection case 15 is not damaged when the vehicle undergoes a collision, and the impact strength is set so that the strength of the battery protection case 15 is greater than the strength of the battery support member 151. The battery support member 151 of the battery protection case includes a weak portion formed therein of which the amount of deformation is adjusted by the load during a collision. Note that the method of adjusting the impact strength of the battery support member 151 may be any known method such as breakable bolt, as well as the provision of a weak portion.

The outer wall of the battery protection case 15 includes a slope 152 formed therein so as to conform to the slope of the outer wall of the passenger protecting structure 20, as shown in FIG. 17.

With such a configuration, when the vehicle undergoes a lateral collision, the battery protection case 15 moves as if to slide along the tangential line of the slope 202 of the passenger protecting structure 20. Therefore, it contacts the passenger protecting structure 20 in a surface contact without localizing the stress of impact, and it is possible to effectively prevent the passenger protecting structure 2C from being damaged. In the case of a head-on collision or a rear-end collision, the battery protection case 15 moves as if to be pushed out of the vehicle left or right along the outer surface of the passenger protecting structure 20, and it is possible to protect the batteries 150 and the passenger protecting structure 20 from a damage.

[Head Protecting Airbag]

Next, an airbag for protecting the head of the passenger will be described based on FIG. 21.

Figure 21:
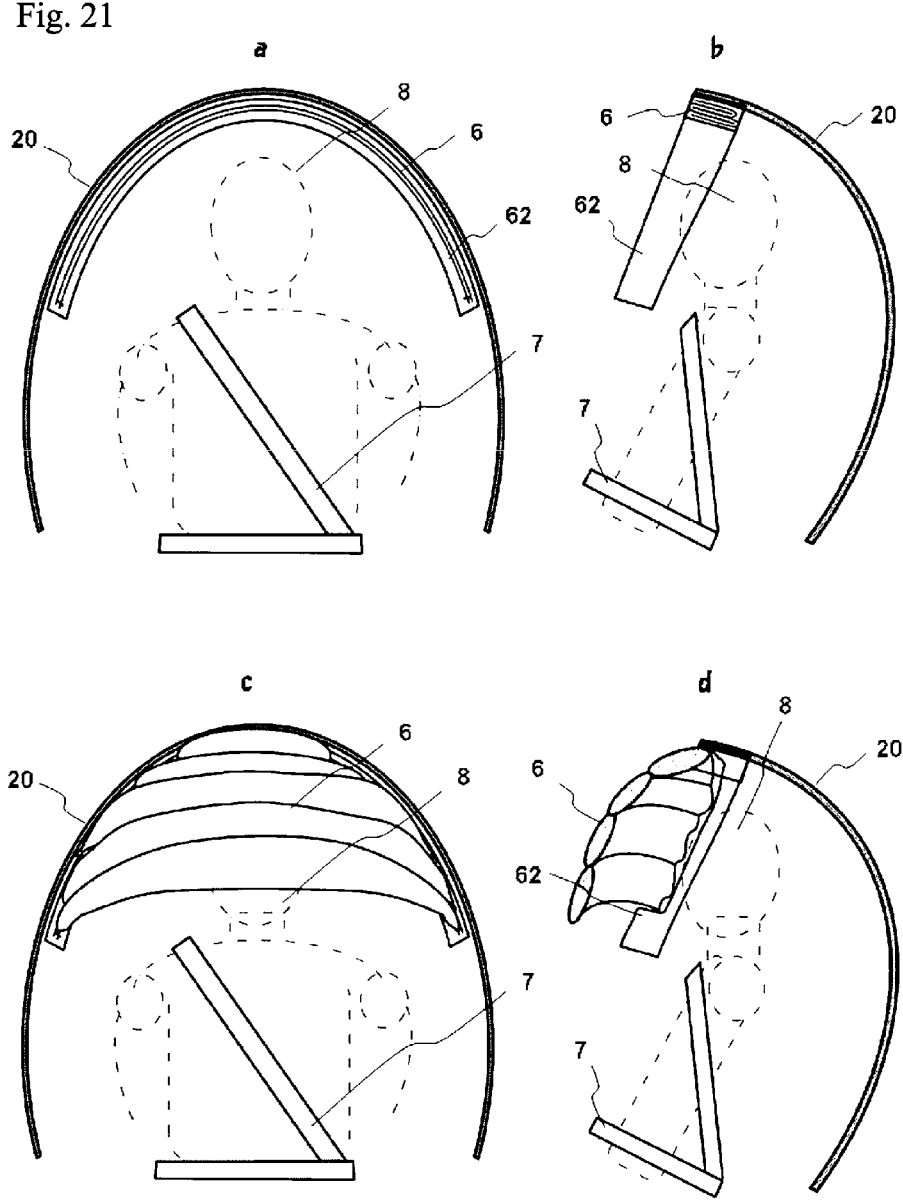
FIG. 21 A schematic cross-sectional view showing a head airbag.

FIG. 21 shows the action of the airbag for protecting the head of the passenger, wherein FIGS. 21a and 21b show a state where an airbag 6 is accommodated while being folded, and FIGS. 21c and 21d show a state where the airbag 6 has been deployed upon collision. An airbag container 62 accommodating the airbag 6 is formed along the inner wall of the seat section protecting structure 22, which is the rear half of the passenger protecting structure 20, the airbag container 62 being formed in an inverse U-letter shape so as to cover the left side, the right side and the upper side of a head 8 of the passenger seated in a single driver seat 3 in the width direction of the vehicle, with the airbag 6 folded and accommodated inside the airbag container 62.

When an acceleration sensor (not shown) or a tilt sensor (not shown) detects a collision or a rollover of the vehicle, the automatic retractor of a seatbelt 7 is activated to thereby secure the passenger onto the seat 3. Generally simultaneously, an inflator (not shown) is activated so that the airbag 6 is deployed, in front of the head 8 of the passenger while remaining fixed to the inner side of the seat section protecting structure, into a semi-flattened dome-shaped so as to cover the front side and the lateral side of the head, thereby inhibiting the forward movement of the head 8.

Note that when the airbag 6 is in the deployed state, the upper end portion and the left and right lateral end portions of the airbag are supported by the seat section protecting structure 22, which is the rear half of the passenger protecting structure 20. Thus, the movement of the head 8 is not suppressed by the expansion force of the airbag 6, but the forward movement of the head 8 is prevented by the tension of the airbag 6. Therefore, it is not necessary to excessively expand the airbag 6, and although it requires a pressure for instantaneous deployment, it does not require a pressure for expansion. Therefore, it is preferred that the pressure for deployment and shrinking is adjusted as necessary. A sensor (not shown) for detecting the posture of the passenger, particularly the position of the head 8, during a collision may be provided so that the airbag 6 for protecting the head is activated on the condition that the head 8 of the passenger is not present on the front side of the position into which the airbag 6 is deployed and that the seatbelt 7 is worn.

With such a configuration, the airbag 6 is deployed on the front side of the head 8 during a collision or a rollover, and using it together with the seatbelt 7, it is possible to reduce the amount of movement of the head 8 of the passenger, as compared with a case where an airbag is provided in the steering handle, thus minimizing the damage to the head or the neck of the passenger.

[Side Airbag]

Figure 22:
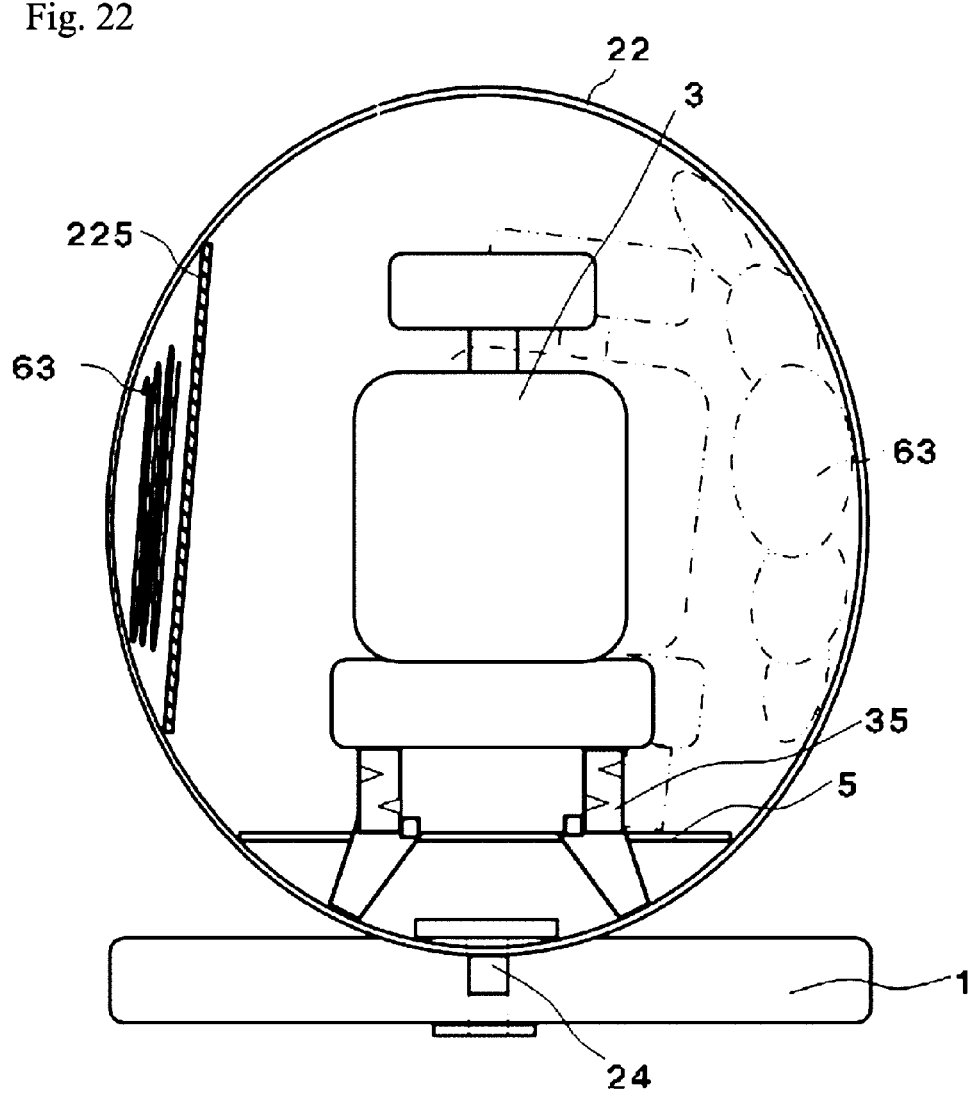
FIG. 22 A cross-sectional front view of the passenger protecting structure showing the action of a side airbag.
Figure 23:
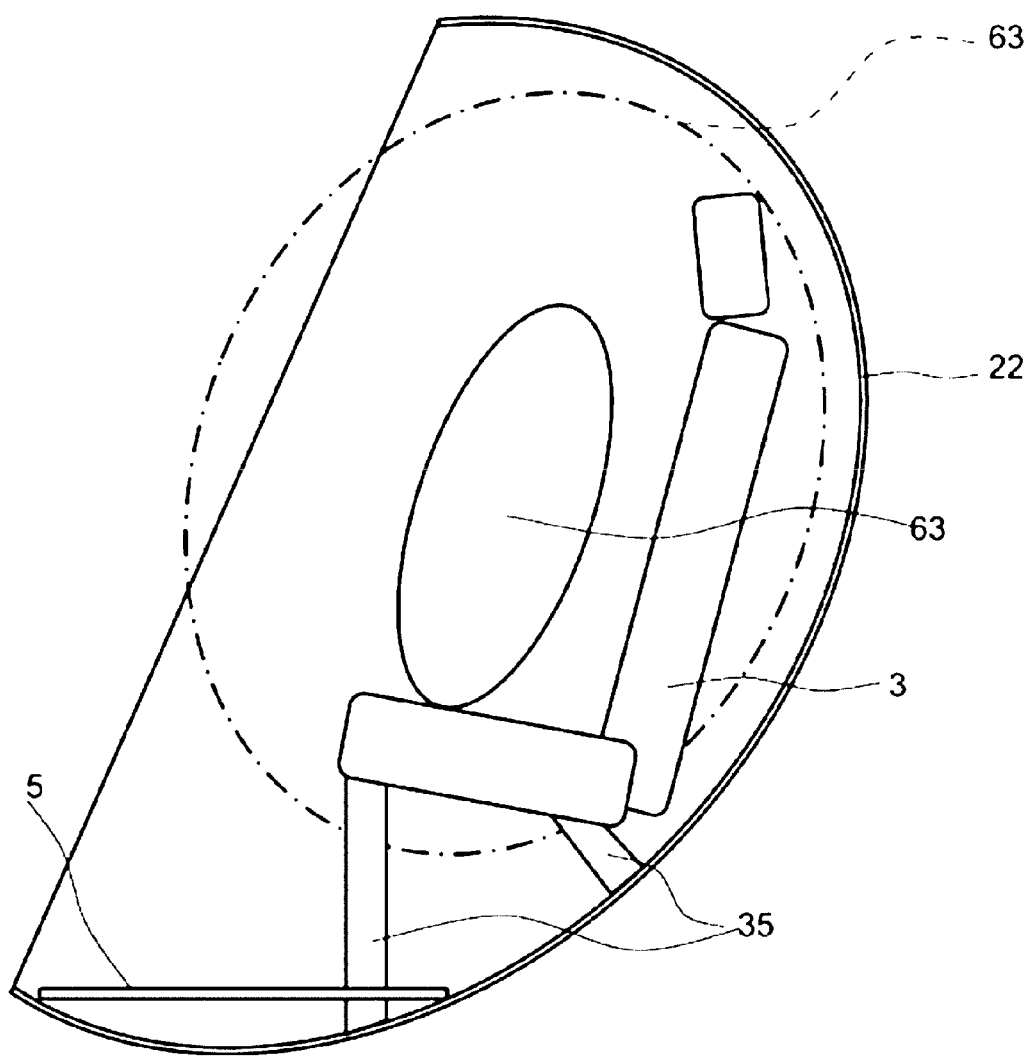
FIG. 23 A cross-sectional side view of the passenger protecting structure (seat section protecting structure) showing the position of the side airbag.

A side airbag 63 shown in FIG. 22 and FIG. 23, when unexpanded, is folded and accommodated, on the side of the seat, between the inner side of the outer shell and the interior cover 225 while being close to the inner side of the outer shell of the seat section protecting structure 22, which is formed in an arc shape bulging outwardly (see the left portion of FIG. 22). The right portion of FIG. 22 shows the airbag when expanded, where the airbag has been developed while being expanded from the inside of the outer shell of the seat section protecting structure 22 toward the center of the passenger compartment while being close to the inner side of the outer shell, over an area extending from the side of the head of the passenger to the side of the knees. When an acceleration sensor (not shown) or a tilt sensor (not shown) detects a lateral collision or a rollover, an inflator (not shown) is activated so as to expand the side airbag 63.

Since the cross section of the seat section protecting structure 22 is generally elliptical, the vertical intermediate portion of the lateral side portion thereof, where the side airbag 63 is accommodated and deployed, is bulging outward in an arc-shaped. Therefore, it is possible to ensure a space for deploying the airbag between the seat 3 and the inner side of the outer shell of the seat section protecting structure 22, thereby allowing for reliable deployment of the side airbag 63, and also making it possible to accommodate a larger side airbag 63 than conventional side airbags.

Note that in the example of the present embodiment, the seat support member 35 supporting the seat 3 has a weak portion formed therein, and it is therefore possible to absorb a part of a lateral impact through deformation of this weak portion.

REFERENCE SIGNS LIST

1 Chassis frame
101 Crushable zone

11 Front wheels
12 Rear wheels
13 Driving device
14 Steering device
15 Battery protection case
150 Battery (cell)
151 Battery support member
152 Slope portion
2 Passenger compartment
20 Passenger protecting structure
20a Opening
201 Structure moving space area
202 Slope portion
21 Front section protecting structure
211 Windshield
212 Front horizontal sub-frame
213 Vertical sub-frame
22 Seat section protecting structure
222 Rear horizontal sub-frame
223 Vertical sub-frame
224 Lower sub-frame
225 Interior cover
231 Front link (support member)
232 Rear link (support member)
233 Actuator
24 Swivel axis (support member)
241 Guide rail (support member)
242 Roller (support member)
25 Coupling lock means
251 Striker
252 Hook
253 Actuator
26 Positioning means
261 Tapered pin
262 Tapered hole
3 Seat
32 Rear seat
33 Child seat
35 Seat support member
351 Slide rail
43 Handle grip
41 Steering post
42 Steering handle
44 Steering force transmitting means
441 Bowden wire
442 Hydraulic piping
451 Hydraulic piston pump
452 Hydraulic actuator
5 Floor
6 Airbag
62 Airbag container
63 Side airbag
7 Seatbelt
8 Passenger's head

The invention claimed is:

1. A compact vehicle comprising:
a chassis frame supporting a front wheel, a rear wheel, a driving device for driving the front wheel or the rear wheel, and a steering device for steering the front wheel or the rear wheel;
a passenger compartment arranged generally at a center of the chassis frame; and
a single passenger seat in a width direction of the vehicle, the passenger seat being arranged in the passenger compartment;
wherein a passenger protecting structure is formed by an outer shell of the passenger compartment and a sub-frame;
the passenger protecting structure is formed by a seat section protecting structure and a front section protecting structure;
the seat section protecting structure covers lateral sides and an upper side of the seat; has a single opening on a front side of the seat, allowing the passenger to get on/off; and is supported on the chassis frame so that the seat section protecting structure can swivel horizontally together with the seat; and
the front section protecting structure is capable of coupling to the seat section protecting structure so as to shut the opening of the seat section protecting structure; and is supported on the chassis frame independently of the seat section protecting structure.

2. The compact vehicle according to claim 1, wherein an un-swiveled position is defined as a position where the opening of the seat section protecting structure is facing in a forward direction with respect to a vehicle running direction;
a swiveled position is defined as a position where the opening of the seat section protecting structure is facing either left or right with respect to the vehicle running direction;
a coupled position is defined as a position where the front section protecting structure and the seat section protecting structure are coupled to each other;
a separated position is defined as a position where the front section protecting structure and the seat section protecting structure are separated from each other; and
the front section protecting structure or the seat section protecting structure is moved between the coupled position and the separated position so that the front section protecting structure is out of a range of swivel of the seat section protecting structure so that the seat section protecting structure can swivel between the un-swiveled position and the swiveled position.

3. The compact vehicle according to claim 2, wherein the front section protecting structure is supported, via a support member, on the chassis frame independently of the seat section protecting structure;
a bent portion is formed in an intermediate portion of the support member of the front section protecting structure; and
an impact strength of the support member of the front section protecting structure is set to be lower than an impact strength of the passenger protecting structure.

4. The compact vehicle according to claim 1, wherein the seat section protecting structure includes, in a vertically intermediate portion thereof, a generally arc-shaped rear horizontal sub-frame extending from behind the seat and covering a left side and a right side to be open on a front side;
the front section protecting structure includes, in a vertically intermediate portion thereof, a generally arc-shaped front horizontal sub-frame which is open on a rear side; and
a ring-shaped horizontal sub-frame assembly is formed by the rear horizontal sub-frame and the front horizontal sub-frame.

5. The compact vehicle according to claim 1, wherein the opening of the seat section protecting structure is reinforced by a ring-shaped vertical sub-frame.

6. A compact vehicle comprising:
a chassis frame supporting a front wheel, a rear wheel, a driving device for driving the front wheel or the rear wheel, and a steering device for steering the front wheel or the rear wheel;
a passenger compartment arranged generally at a center of the chassis frame; and
a single passenger seat in a width direction of the vehicle, the passenger seat being arranged in the passenger compartment, wherein:
a passenger protecting structure is formed by an outer shell of the passenger compartment and a sub-frame;
the passenger protecting structure includes a seat section protecting structure;
the seat section protecting structure: covers lateral sides and an upper side of the seat; has a single opening on a front side of the seat, allowing the passenger to get on/off; and is supported on the chassis frame so that the seat section protecting structure can swivel horizontally together with the seat; and
the seat section protecting structure includes a steering handle, wherein the steering handle is supported at a bottom end portion thereof so that the steering handle can pivot about a generally vertical axis of a steering post attached at a center of the seat section protecting structure in a left-right direction under the seat; diverges from the steering post sideways left and right, extending upward between an outer side of the seat and left and right inner walls of the seat section protecting structure along the inner walls; and includes a handle grip provided on an upper end portion thereof.

\* \* \* \* \*